(12) United States Patent
Kline et al.

(10) Patent No.: US 12,013,371 B2
(45) Date of Patent: Jun. 18, 2024

(54) SURFACE TYPE DETECTION

(71) Applicant: InvenSense, Inc., San Jose, CA (US)

(72) Inventors: Mitchell H Kline, Owensboro, KY (US); Joe Youssef, Noyarey (FR)

(73) Assignee: InvenSense, Inc., San Jose, CA (US)

( * ) Notice: Subject to any disclaimer, the term of this patent is extended or adjusted under 35 U.S.C. 154(b) by 569 days.

(21) Appl. No.: 17/226,447

(22) Filed: Apr. 9, 2021

(65) Prior Publication Data
US 2022/0326185 A1 Oct. 13, 2022

(51) Int. Cl.
*G01N 29/04* (2006.01)
*A47L 9/28* (2006.01)
*G01N 29/22* (2006.01)

(52) U.S. Cl.
CPC .......... *G01N 29/041* (2013.01); *A47L 9/2826* (2013.01); *A47L 9/2852* (2013.01); *G01N 29/225* (2013.01)

(58) Field of Classification Search
CPC .. G01N 29/041; G01N 29/225; A47L 9/2826; A47L 9/2852; A47L 2201/06
See application file for complete search history.

(56) References Cited

U.S. PATENT DOCUMENTS 11,547,262 B2 * 1/2023 Jang ................... A47L 11/4013
2020/0217057 A1 7/2020 Spiro et al.
2021/0156993 A1 * 5/2021 Gordon ............... A47L 11/4011
2022/0007908 A1 * 1/2022 Wang ..................... G01B 11/02
2023/0255418 A1 * 8/2023 Choi ..................... A47L 9/1409
15/319

FOREIGN PATENT DOCUMENTS

CN 110710935 1/2020
CN 117083006 A 11/2023
EP 2407075 1/2012

OTHER PUBLICATIONS

PCT Application No. PCT/US2022/023888; International Search Report and Written Opinion of the International Searching Authority; dated Jul. 8, 2022; 11 pages.

* cited by examiner

*Primary Examiner* — Manuel A Rivera Vargas

(57) ABSTRACT

A robotic cleaning appliance includes a sonic transducer and a processor coupled with a housing. The sonic transducer transmits sonic signals toward a surface within its ringdown distance and receives corresponding returned signals. Following cessation of the sonic signals, the processor samples the ringdown signal generated by the sonic transducer during an early portion before the corresponding returned signals have reflected back to the sonic transducer, and during a later portion which includes the corresponding returned signals. The processor utilizes the sampled early portion to estimate a void ringdown signal of which represents performance of the sonic transducer in absence of returned signals being received. The processor compares the estimated void ringdown signal to the later portion of the ringdown signal and generates a metric based on the comparison. The processor utilizes the metric to determine a type of the surface, out of a plurality of surface types.

20 Claims, 15 Drawing Sheets

1200

```
┌─────────────────────────────────────────────────────────────────┐
│ RECEIVE RETURNED SIGNALS FROM THE SONIC TRANSDUCER, WHEREIN THE │
│ SONIC TRANSDUCER IS CONFIGURED TO TRANSMIT SONIC SIGNALS TOWARD │
│   A SURFACE AND RECEIVE THE RETURNED SIGNALS REFLECTED FROM THE │
│    SURFACE, WHEREIN THE RETURNED SIGNALS CORRESPOND TO THE      │
│  TRANSMITTED SONIC SIGNALS, AND WHEREIN THE SURFACE IS WITHIN A │
│     RINGDOWN DISTANCE ASSOCIATED WITH THE SONIC TRANSDUCER      │
│                              1210                                │
└─────────────────────────────────────────────────────────────────┘
                                 │
                                 ▼
┌─────────────────────────────────────────────────────────────────┐
│      RESPONSIVE TO CESSATION OF ACTIVE TRANSMISSION OF THE SONIC│
│       SIGNALS, SAMPLE A PLURALITY OF POINTS OF A RINGDOWN SIGNAL│
│   GENERATED BY THE SONIC TRANSDUCER, WHEREIN THE SAMPLING OCCURS│
│    DURING AN EARLY PORTION OF THE RINGDOWN SIGNAL BEFORE THE    │
│    RETURNED SIGNALS FROM THE SURFACE HAVE REFLECTED BACK TO BE  │
│    RECEIVED BY THE SONIC TRANSDUCER AND THE SAMPLING ALSO OCCURS│
│    DURING A LATER PORTION OF THE RINGDOWN SIGNAL WHICH INCLUDES THE│
│                          RETURNED SIGNALS                        │
│                              1220                                │
└─────────────────────────────────────────────────────────────────┘
                                 │
                                 ▼
┌─────────────────────────────────────────────────────────────────┐
│    ESTIMATE A VOID RINGDOWN SIGNAL OF THE SONIC TRANSDUCER USING│
│  THE EARLY PORTION OF THE PLURALITY OF SAMPLED POINTS, WHEREIN THE│
│   ESTIMATED VOID RINGDOWN SIGNAL REPRESENTS PERFORMANCE OF THE  │
│   SONIC TRANSDUCER IN ABSENCE OF ANY RETURNED SIGNALS BEING     │
│                            RECEIVED                              │
│                              1230                                │
└─────────────────────────────────────────────────────────────────┘
                                 │
                                 ▼
┌─────────────────────────────────────────────────────────────────┐
│  COMPARE THE ESTIMATED VOID RINGDOWN SIGNAL TO THE LATER PORTION│
│                    OF THE RINGDOWN SIGNAL                        │
│                              1240                                │
└─────────────────────────────────────────────────────────────────┘
                                 │
                                 ▼
┌─────────────────────────────────────────────────────────────────┐
│              GENERATE A METRIC BASED ON A COMPARISON             │
│                              1250                                │
└─────────────────────────────────────────────────────────────────┘
                                 │
                                 ▼
┌─────────────────────────────────────────────────────────────────┐
│  UTILIZE THE METRIC TO DETERMINE THE TYPE OF THE SURFACE, OUT OF A│
│                    PLURALITY OF SURFACE TYPES                    │
│                              1260                                │
└─────────────────────────────────────────────────────────────────┘
```

STORE THE ESTIMATED VOID RINGDOWN SIGNAL FOR FUTURE USE WITH A SUBSEQUENT TRANSMISSION OF SONIC SIGNALS BY THE SONIC TRANSDUCER.
1270

SURFACE TYPE DETECTION

BACKGROUND

A variety of devices exist which move about on or operate on floors or other surfaces such as walls, windows, roofs, tables, countertops, sidewalks, roads, and the like. The surfaces may be indoor surfaces, outdoor surfaces, or some combination. One or more examples of such a device may be semi-autonomous, by which is meant that while operating on one or more surfaces some functions of the device are controlled by a human and some are automated. One or more examples of such a device may be robotic, by which is meant that while operating on one or more surfaces some or all functions of the device may operate autonomously under the control of one or more processors. Some examples of these devices may include, but are not limited to: remote control vehicles, telepresence robots, electric scooters, electric wheelchairs, wheeled delivery robots, flying drones operating near a surface or about to land on or take off from a surface, wheeled delivery vehicles, floor vacuums, and robotic cleaning appliances (which include robotic floor cleaners and/or robotic floor vacuums).

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 12A-12B illustrate a flow diagram of an example method of surface type detection, in accordance with various embodiments.

DESCRIPTION OF EMBODIMENTS

Figure 1A:
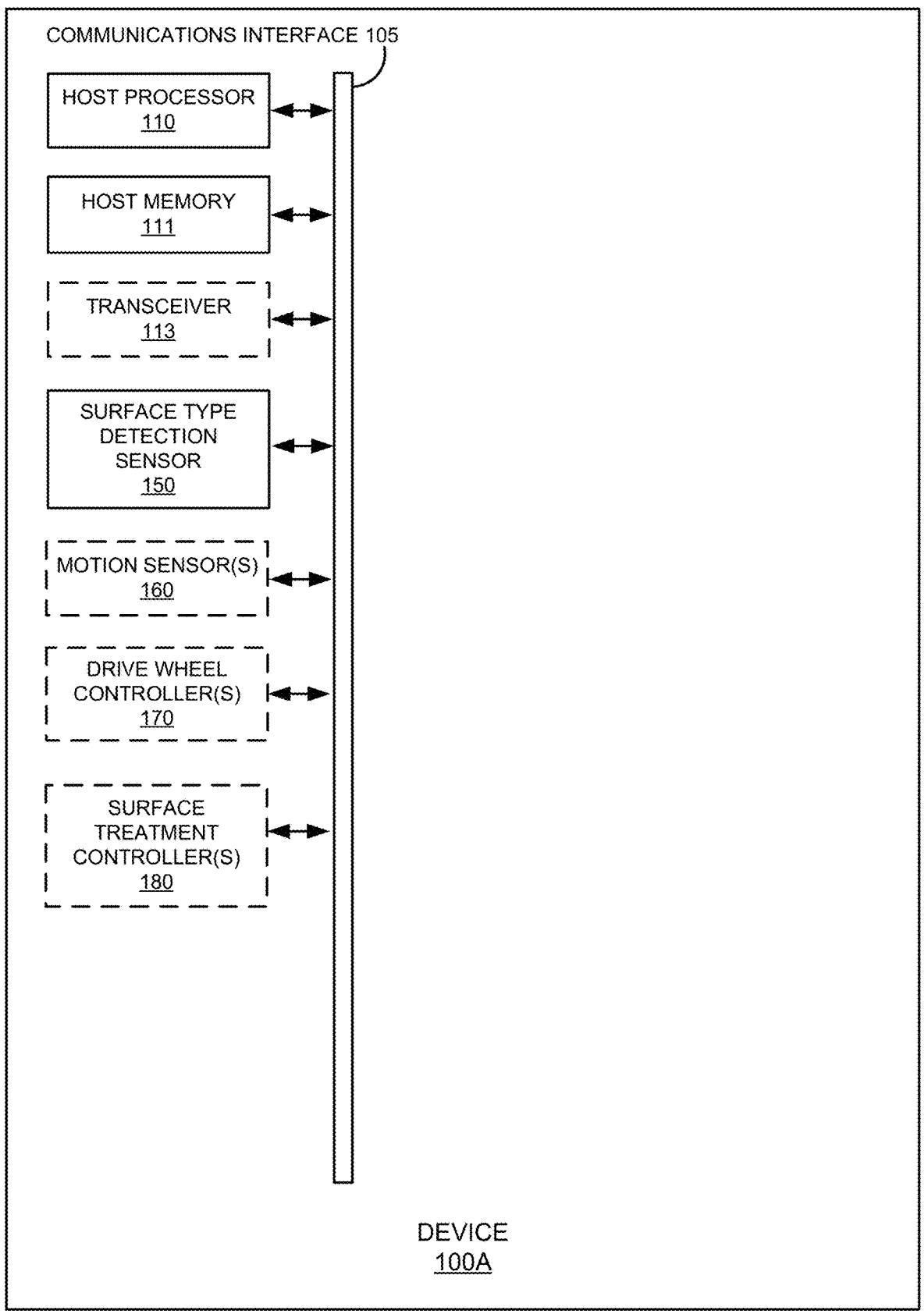
FIGS. 1A and 1B show example block diagrams of some aspects of a device which moves about or operates on a surface, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

A variety of devices which move about on or operate on floors or other surfaces may benefit from being able to determine information about surface upon which they are moving or operating. Surfaces may include floors, building exteriors, windows, dirt, gravel, fabric, roofing, roads, sidewalks, trails, water (or other liquid), etc. A surface may be flat and smooth or rough and textured. In some embodiments, the surface may be fixed while the device operates upon or moves upon the surface. In other embodiments, the surface may move while the device remains fixed or moves relative to the moving surface. There are a variety of broad "surface types," upon which such devices may operate or move. According to some aspects, these "surface types" can be divided into two major groups, hard surfaces and soft surfaces. In some embodiments, there may be sub-groups in each of these two major groups. In some embodiments, there may be additional or alternative "major groups" such as wet, dry, clean, dirty, etc.

For purposes of example and not of limitation, consider flooring surfaces which can be divided into hard floors and soft floors. Hard floors include flooring surfaces such as, but not limited to: tile, wood, linoleum, laminate flooring, metal, terrazzo, concrete, stone, and the like. Soft floors include flooring surfaces such as, but not limited to: rugs, sculptured carpet, low pile carpet, cut pile carpet, high pile carpet, and other types of carpeting, and the like. Although, flooring has been described as being dividable into two major categories of hard surfaces and soft surfaces; flooring surfaces may be divided in any number of categories varying from hard to soft (e.g., hard, medium hard, medium soft, soft, etc.).

During the operation of a device on a surface or as it moves about on a surface, it may be advantageous for the device to detect information about the surface, such as whether it is wet (and in some instances how wet on a scale of wetness), dirty (and in some instances, how dirty and/or dirty with what), dry, hard (and in some instances, how hard on a scale of hardness), soft (and in some instances how soft on a scale of softness), etc. As will be described herein, such detection of a surface type may involve transmitting sonic signals toward the surface and processing returned sonic signals to determine the surface type. These sonic signals may include signals in one or more of the infrasound range, the acoustic range, and ultrasonic range. Returned signals include direct returned signals (which are transmitted and bounce directly to a receiver/transducer) and secondary returned signals (which are multi-path reflected prior to being arriving at a receiver/transducer). When a sonic transducer is driven with a drive waveform to cause it to oscillate and transmit a sonic signal, it will continue to oscillate for a period of time after the drive waveform has ceased. When the drive waveform ceases, active transmission from the sonic transducer ceases but the transducer will still continue to oscillate for a period of time as it rings down (e.g., as the driven oscillations attenuate). The time period associated with this attenuation or ringdown of the driven oscillation may be referred to as the ringdown time of the sonic transducer. In some embodiments the ringdown time may be similar in length to the time period that the sonic transducer was actively driven immediately prior to ringdown beginning. Because the transducer is still passively oscillating during the ringdown time, these passive oscillations may make it difficult to distinguish returned signals received during the ringdown time, thus effectively blinding the sonic transducer to an object providing a returned signal which reaches the sonic transducer during ringdown.

For example, if the sensor is close to a surface such as the floor, the round trip time-of-flight of a returned signal (especially a primary returned signal) may be very small such that it arrives during a later portion of the ringdown time period. In such a case, the sensed surface is within a ringdown distance of the transducer because returned signals are received while ringdown is still occurring. Because of this, detection of a quickly received returned signal from a surface within the ringdown distance may be hindered or otherwise influenced by transducer ringdown. Even if the returned signal is very strong it may be overwhelmed by the greater amplitude of and/or interference caused by ringdown of a sonic transducer used as surface type detection sensor. Put differently, a sonic transducer in ringdown may still be vibrating with enough amplitude to effectively disguise a comparatively much smaller returned signal that it receives during a portion of its ringdown time period.

Some embodiments herein describe techniques for discerning a returned signal from a ringdown signal during a ringdown time period of a sonic transducer. For example, a "void ringdown signal" can be estimated by sampling points of the ringdown signal very early in the ringdown time period before returned signals have arrived, and then extrapolating those points using a decay factor. This estimated void ringdown signal represents what a pure ringdown signal from the sonic transducer would look like in the absence of any returned signals arriving and influencing it with constructive or destructive interference. This estimated void ringdown signal can then be compared to the actual ringdown signal which occurs, and the comparison can be used to generate a metric which can be used to determine a type of surface which provided returned signals received during the ringdown of the sonic transducer. The metric may be a result of background subtraction, comparison of magnitude, comparison of curve length, comparison to a threshold, and/or other comparison. This technique for comparison of a portion of the actual received ringdown signal with an estimated void ringdown signal can be used with a magnitude signal or with one or more demodulated components such as the in-phase signal or the quadrature signal of the complex domain.

Discussion begins with a description of notation and nomenclature. Discussion then shifts to description of some block diagrams of example components of some example devices which moves about or operate on a surface. Some example depictions of a device, in the form of robotic cleaning appliance, are discussed. Some examples depictions of a surface type detection sensor assembly are described. A signal path of a sonic transducer is described. Graphs depicting the estimation of a void ringdown signal from a magnitude signal and comparison of the two to form a metric are discussed. A block diagram for generation of a void ringdown signal in the complex domain and comparison to a portion of an actual ringdown signal in the complex domain is discussed. Graphs depicting comparison of a ringdown and void ringdown signal by curve lengths in the complex domain are described and metrics are discussed. Use of generated metrics and other information to train a classifier and perform machine learning are discussed. Finally, operation of a robotic cleaning appliance and components thereof, to include a sonic transducer and processor, are discussed in conjunction with description of an example method of surface type detection.

Notation and Nomenclature

Some portions of the detailed descriptions which follow are presented in terms of procedures, logic blocks, processes, modules and other symbolic representations of operations on data bits within a computer memory. These descriptions and representations are the means used by those skilled in the data processing arts to most effectively convey the substance of their work to others skilled in the art. In the present application, a procedure, logic block, process, module, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device/component.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "transmitting," "receiving," "sampling," "estimating," "comparing," "generating," "storing," "providing," "classifying," "utilizing," and "determining," or the like, refer to the actions and processes of an electronic device or component such as: a host processor, a sensor processing unit, a sensor processor, a digital signal processor or other processor, a memory, a surface type detection sensor (e.g., a sonic transducer), a robotic cleaning appliance, a device configured to operate on or move about a surface, some combination thereof, or the like. The electronic device/component manipulates and transforms data represented as physical (electronic and/or magnetic) quantities within the registers and memories into other data similarly represented as physical quantities within memories or registers or other such information storage, transmission, processing, or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory computer/processor-readable storage medium comprising computer/processor-readable instructions that, when executed, cause a processor and/or other components of a computer or electronic device to perform one or more of the methods described herein. The non-transitory processor-readable data storage medium may form part of a computer program product, which may include packaging materials.

The non-transitory processor-readable storage medium (also referred to as a non-transitory computer-readable storage medium) may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a plurality of microprocessors, one or more microprocessors in conjunction with an ASIC or DSP, or any other such configuration or suitable combination of processors.

In various example embodiments discussed herein, a chip is defined to include at least one substrate typically formed from a semiconductor material. A single chip may for example be formed from multiple substrates, where the substrates are mechanically bonded to preserve the functionality. Multiple chip (or multi-chip) includes at least two substrates, wherein the two substrates are electrically connected, but do not require mechanical bonding.

A package provides electrical connection between the bond pads on the chip (or for example a multi-chip module) to a metal lead that can be soldered to a printed circuit board (or PCB). A package typically comprises a substrate and a cover. An Integrated Circuit (IC) substrate may refer to a silicon substrate with electrical circuits, typically CMOS circuits but others are possible and anticipated. A MEMS substrate provides mechanical support for the MEMS structure(s). The MEMS structural layer is attached to the MEMS substrate. The MEMS substrate is also referred to as handle substrate or handle wafer. In some embodiments, the handle substrate serves as a cap to the MEMS structure.

Some embodiments may, for example, comprise a surface type detection sensor 150. This sensor may be any suitable sonic sensor operating in any suitable sonic range. For example, in some embodiments, the surface type detection sensor may be an ultrasonic sensor which utilizes a MEMS ultrasonic transducer. In some embodiments, the surface type detection sensor may include digital signal processor (DSP) which may be disposed as a part of an ASIC which may be integrated into the same package as a transducer. One example of such an ultrasonic sensor which may be utilized with various embodiments, without limitation thereto, is the CH101 ultrasonic range sensor from Chirp Microsystems, a TDK Group Company, of Berkley, California. The CH101 is only one example of an ultrasonic sensor, other types and/or brands of ultrasonic sensors may be similarly utilized.

Some embodiments may, for example, comprise one or more motion sensors. For example, an embodiment with an accelerometer, a gyroscope, and a magnetometer or other compass technology, which each provide a measurement along three axes that are orthogonal relative to each other, may be referred to as a 9-axis device. In another embodiment three-axis accelerometer and a three-axis gyroscope may be used to form a 6-axis device. Other embodiments may, for example, comprise an accelerometer, gyroscope, compass, and pressure sensor, and may be referred to as a 10-axis device. Other embodiments may not include all the sensors or may provide measurements along one or more axes. Some or all of the sensors may be MEMS sensors. Some or all of the sensors may be incorporated in a sensor processing unit along with a sensor processor and disposed in a single semiconductor package.

In some embodiments, for example, one or more sensors may, be formed on a first substrate. Various embodiments may, for example, include solid-state sensors and/or any other type of sensors. The electronic circuits in a sensor processing unit may, for example, receive measurement outputs from the one or more sensors. In various embodiments, the electronic circuits process the sensor data. The electronic circuits may, for example, be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package, such as a single integrated circuit.

Example Device which Moves about or Operates on a Surface

Figure 1B:
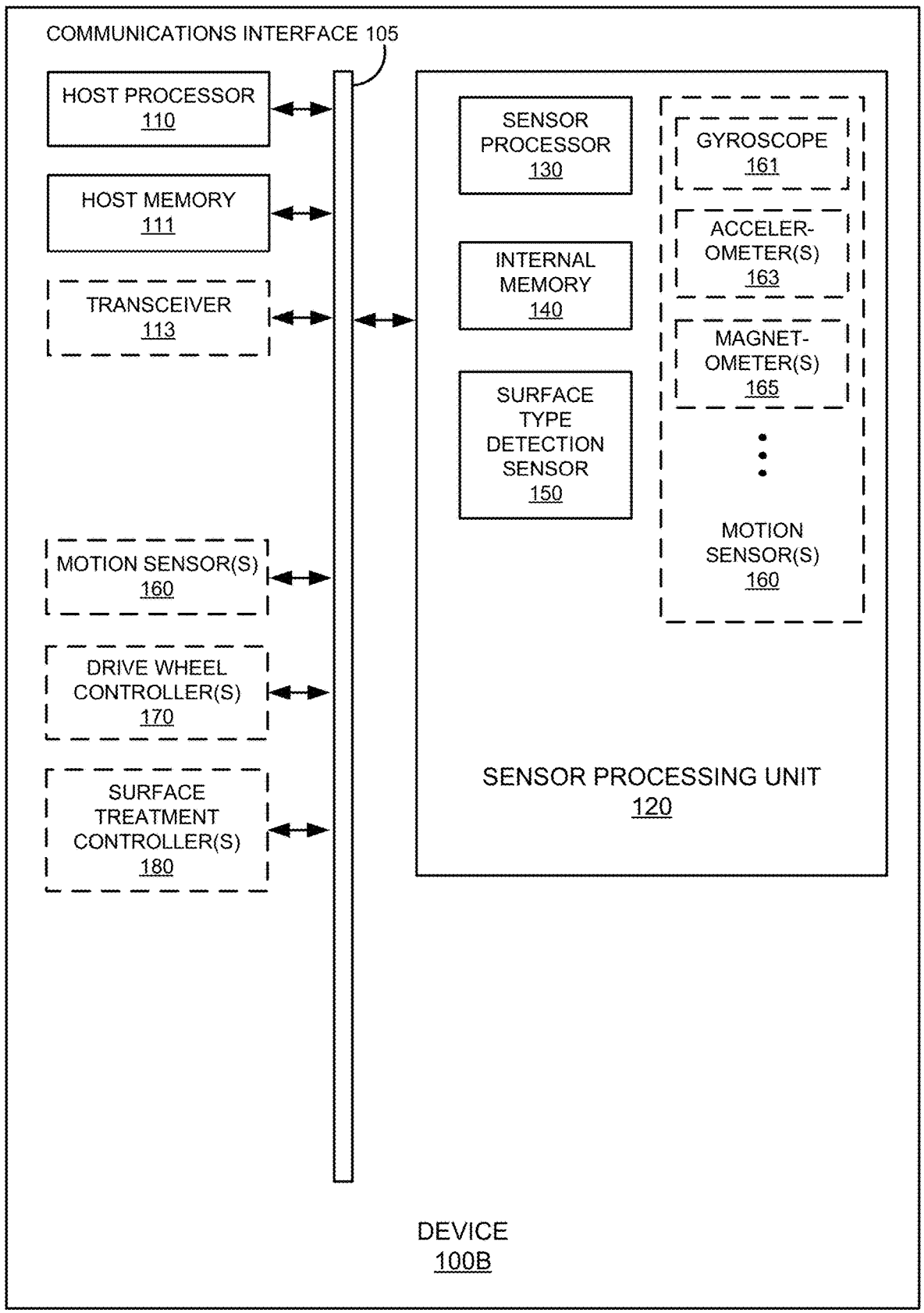

FIGS. 1A and 1B show some example components of a device 100 which moves about or operates on a surface. Some examples of a device 100 may include, but are not limited to: a remote control vehicles, a telepresence robot, an electric scooter, an electric wheelchair, a wheeled delivery robot, a flying drone operating near a surface or about to land on or take off from a surface, a wheeled delivery vehicle, a floor vacuum, and a robotic cleaning appliance (which includes: a robotic floor cleaner, a robotic floor vacuum, or combinations thereof).

FIG. 1A shows a block diagram of components of an example device 100A which moves about or operates on a surface, in accordance with various aspects of the present disclosure. As shown, example device 100A comprises a communications interface 105, a host processor 110, host memory 111, and at least one surface type detection sensor 150. In some embodiments, device 100 may additionally include one or more of a transceiver 113, one or more motion sensors 160, one or more drive wheel controllers 170, and one or more surface treatment controllers 180 (which may control a cleaning tool and/or any surface treatment item that may take an action based upon a surface type determination). Some embodiments may include sensors used to detect motion, position, surface type, or environmental context (e.g., nearby objects and/or obstacles, whether a surface is hard or soft, whether a surface is carpeted or not carpeted, whether a surface is clean or dirty, whether a surface is wet or dry, etc.); some examples of these sensors may include, but are not limited to, infrared sensors, cameras, microphones, and global navigation satellite system sensors (i.e., a global positioning system receiver). As depicted in FIG. 1A, included components are communicatively coupled with one another, such as, via communications interface 105.

The host processor 110 may, for example, be configured to perform the various computations and operations involved with the general function of device 100 (e.g., sending commands to move, steer, avoid obstacles, and operate/control the operation of tools). Host processor 110 can be one or more microprocessors, central processing units (CPUs), DSPs, general purpose microprocessors, ASICs, ASIPs, FPGAs or other processors which run software programs or applications, which may be stored in host memory 111, associated with the general and conventional functions and capabilities of device 100.

Communications interface 105 may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent and may include a plurality of communications interfaces. Communications interface 105 may facilitate communication between SPU 120 and one or more of host processor 110, host memory 111, transceiver 113, surface type detection sensor 150, motion sensor(s) 160, drive wheel controller(s) 170, and/or surface treatment controller(s) 180.

Host memory 111 may comprise programs, modules, applications, or other data for use by host processor 110. In some embodiments, host memory 111 may also hold information that that is received from or provided to sensor processing unit 120 (see e.g., FIG. 1B). Host memory 111 can be any suitable type of memory, including but not limited to electronic memory (e.g., read only memory (ROM), random access memory (RAM), or other electronic memory).

Transceiver 113, when included, may be one or more of a wired or wireless transceiver which facilitates receipt of data at device 100 from an external transmission source and transmission of data from device 100 to an external recipient. One example of an external transmission source/external recipient may be a base station to which device 100 returns for charging, maintenance, docking, etc. By way of example, and not of limitation, in various embodiments, transceiver 113 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications (or the like) for wireless personal area network communication), and a wired a serial transceiver (e.g., a universal serial bus for wired communication).

Surface type detection sensor 150 may be a sonic transducer. In some embodiments, surface type detection sensor 150 is an ultrasonic transducer (i.e., a sonic transducer which operates in the ultrasonic frequency range). In some embodiments, where surface type detection sensor 150 operates in an ultrasonic range, it may operate in a range between 50 kHz and 500 kHz or in a range between 150 kHz and 200 kHz. Of course, other ultrasonic ranges are anticipated and usable. Surface type detection sensor 150 is configured to transmit sonic signals toward a surface and receive sonic returned signals. The sonic signals transmitted may include signals in one or more of the infrasound range, the acoustic range, and ultrasonic range. Returned signals include direct returned signals (which are transmitted, encounter a surface, and reflect from the surface directly to a receiver) and secondary returned signals (which are multi-path reflected prior to arriving at a receiver). In some embodiments, surface type detection sensor 150 may be part of a surface type detection sensor assembly 350 (see e.g., FIGS. 4A-4C), which may include an acoustic interface 450 (see e.g., FIGS. 4A-4C) such as a tube, cavity, horn, some combination thereof, or the like used to direct transmitted sonic signals toward a surface and to direct sonic returned signals back to surface type detection sensor 150.

Motion sensor(s) 160, when included, may be implemented as MEMS-based motion sensors, including inertial sensors such as a gyroscope 161 or accelerometer 163, or an electromagnetic sensor such as a Hall effect or Lorentz field magnetometer 165. In some embodiments, at least a portion of the motion sensors 160 may also, for example, be based on sensor technology other than MEMS technology (e.g., CMOS technology, etc.). As desired, one or more of the motion sensors 160 may be configured to provide raw data output measured along three orthogonal axes or any equivalent structure.

Drive wheel controller(s) 170 or other mechanism(s) to govern movement, when included, may include motor controllers, switches, and/or logic which operate under instruction to: drive one or more wheels or other mechanisms of movement (e.g., tank treads, propellers), change speed of rotation of a drive wheel or other mechanism of movement, moderate an amount of slip or spin permitted for a drive wheel, move a drive wheel or other mechanism of movement in a desired direction, stop a drive wheel or other mechanism of movement, and/or to steer device 100 using a drive wheel (such as via differential speed or rotation) or other mechanism of movement.

Surface treatment controller(s) 180, when included, may include motor controllers, switches, and or logic to turn on, turn off, and/or adjust the operation and/or orientation of one or more surface treatment items, such as cleaning tool(s) and/or other item(s) that take action based upon a surface type determination.

FIG. 1B shows a block diagram of components of an example device 100B which moves about or operates on a surface, in accordance with various aspects of the present disclosure. Device 100B is similar to device 100A except that it includes a sensor processing unit (SPU) 120 in which surface type detection sensor 150 is disposed. SPU 120, when included, comprises: a sensor processor 130; an internal memory 140; and at least one surface type detection sensor 150. In some embodiments, SPU 120 may additionally include one or more motion sensors 160 (e.g., gyroscope 161, accelerometer 163, magnetometer 165) and/or one or more other sensors such a light sensor, infrared sensor, GNSS sensor, microphone, etc. In various embodiments, SPU 120 or a portion thereof, such as sensor processor 130, is communicatively coupled with host processor 110, host memory 111, and other components of device 100 through communications interface 105 or other well-known means. SPU 120 may also comprise one or more communications interfaces (not shown) similar to communications interface 105 and used for communications among one or more components within SPU 120.

Sensor processor 130 can be one or more microprocessors, CPUs, DSPs, general purpose microprocessors, ASICs, ASIPs, FPGAs or other processors that run software programs, which may be stored in memory such as internal memory 140 (or elsewhere), associated with the functions of SPU 120. In some embodiments, one or more of the functions described as being performed by sensor processor 130 may be shared with or performed in whole or in part by another processor of a device 100, such as host processor 110.

Internal memory 140 can be any suitable type of memory, including but not limited to electronic memory (e.g., read only memory (ROM), random access memory (RAM), or other electronic memory). Internal memory 140 may store algorithms, routines, or other instructions for instructing sensor processor 130 on the processing of data output by one or more of the motion sensors 160 and/or one or more surface type detection sensors 150. In some embodiments, internal memory 140 may store one or more modules which may be algorithms that execute on sensor processor 130 to perform a specific function. Some examples of modules may include, but are not limited to: statistical processing modules, motion processing modules, surface type detection modules, and/or decision-making modules.

Surface type detection sensor 150 may be a sonic transducer which operates in the manner and in any of the sonic ranges previously described. In some embodiments, surface type detection sensor 150 is an ultrasonic transducer, such as a PMUT (piezoelectric micromachined ultrasonic transducer). Surface type detection sensor 150 may be a MEMS device and may be very small, such as having a facing surface of less than 4 mm by 4 mm by 1.5 mm. An ultrasonic sensor may be large or small, depending on the application and the space available. In some embodiments, surface type detection sensor 150 may be a SOC (system on a chip) which includes a DSP. In some embodiments, the SOC packaging of surface type detection sensor 150 comprises sensor processing unit 120 and includes sensor processor 130 and internal memory 140. In some embodiments, surface type detection sensor 150 may be part of a surface type detection sensor assembly (see e.g., FIGS. 4A-4C), which may include a tube used to direct transmitted sonic signals toward a surface and to direct sonic returned signals back to surface type detection sensor 150.

Motion sensors 160, when included, may be implemented as MEMS-based motion sensors, including inertial sensors such as a gyroscope 161 or accelerometer 163, or an electromagnetic sensor such as a Hall effect or Lorentz field magnetometer 165. In some embodiments, at least a portion of the motion sensors 160 may also, for example, be based on sensor technology other than MEMS technology (e.g., CMOS technology, etc.). As desired, one or more of the motion sensors 160 may be configured to provide raw data output measured along three orthogonal axes or any equivalent structure. Motion sensor(s) 160 are communicatively coupled with sensor processor 130 by a communications interface, bus, or other well-known communication means.

Example System

Figure 2:
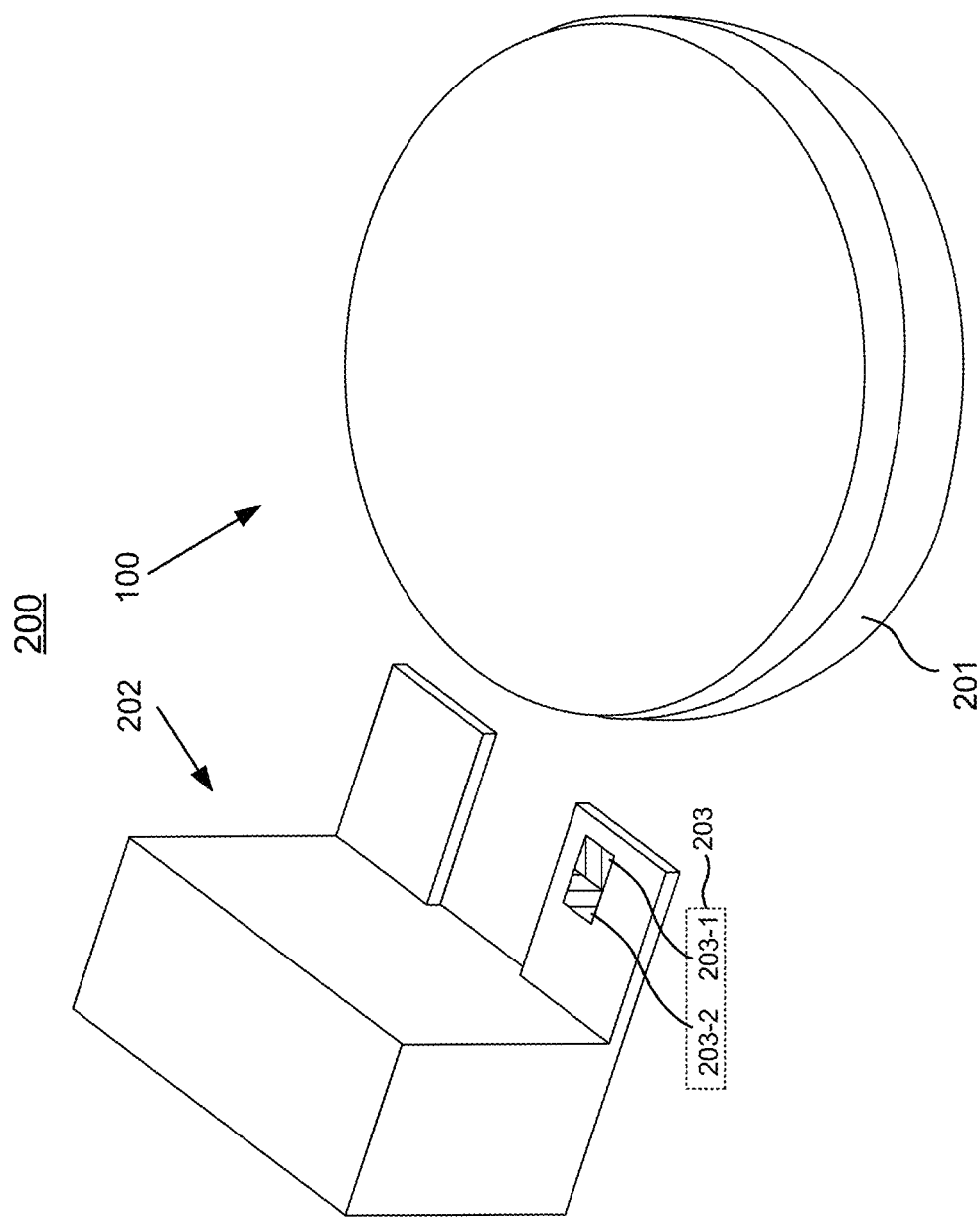
FIG. 2 shows an upper front perspective view of one example of a system which includes a device which moves about or operates on a surface and a base station for the device, in accordance with various embodiments.

FIG. 2 shows an upper front perspective view of one example of a system 200 which includes one embodiment of a device 100 which moves about or operates on a surface and also includes a base station 202 for the device 100, in accordance with various embodiments. Device 100 includes a housing 201 to which one or more items may be coupled. Base station 202 provides a location at which a device 100 may be positioned or parked or docked when not moving about or operating on a surface. In some embodiments, base station 202 (which may also be referred to as dock 202) may provide information/instructions to device 100 and/or receive information from device 100, such as via physical and/or wireless communication coupling to transceiver 113. In some embodiments, base station 202 may provide an electrical charger for device 100 such that, via physical or wireless (e.g., inductive) electrical coupling, base station 202 electrically charges device 100 when device 100 is coupled with or suitably oriented with base station 202. In some embodiments, base station 202 may provide one or more sample surfaces 203 (e.g., 203-1 and 203-2) which can be used to test or calibrate a surface type detection sensor, other electronics, and/or computing resources used by device 100 to detect the type of surface upon which device 100 moves about or operates upon. For example, in some embodiments, one or more of a sample of a soft surface 203-1 and a sample of a hard surface 203-2 may be provided, at known locations to device 100, as a test target which device 100 may sense and detect while positioning itself in base station 202 and/or departing from base station 202. In some embodiments, when two or more different types of sample surfaces 203 are positioned adjacent to one another, device 100 may also test detection of a transition from one surface type (e.g., a soft surface 203-1) to another surface type (e.g., a hard surface 203-2). In some instances, any portion of the surface of base station 202 may be similarly utilized in the fashion of sample surface 203.

Figure 3A:
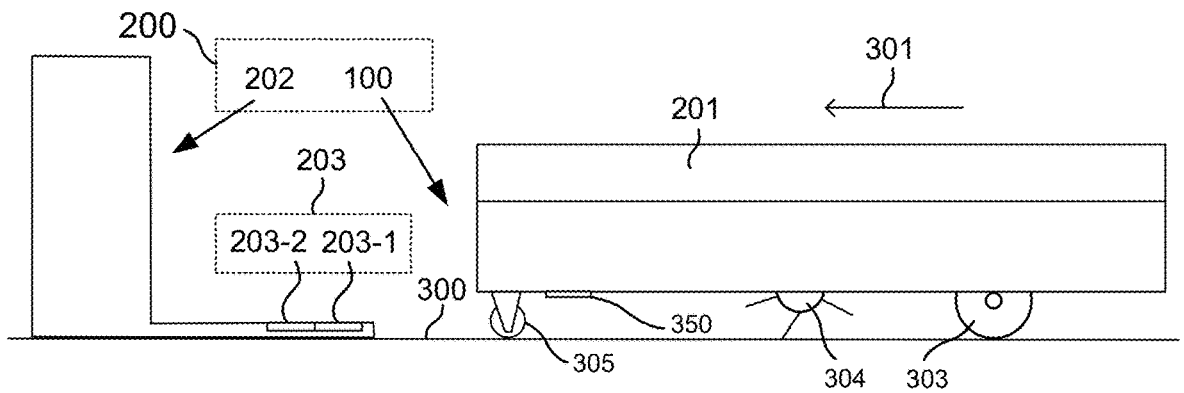
FIGS. 3A-3C show a side elevational view of one example of the system of FIG. 2, which includes a device which moves about or operates on a surface and a base station for the device, in accordance with various embodiments.
Figure 3B:
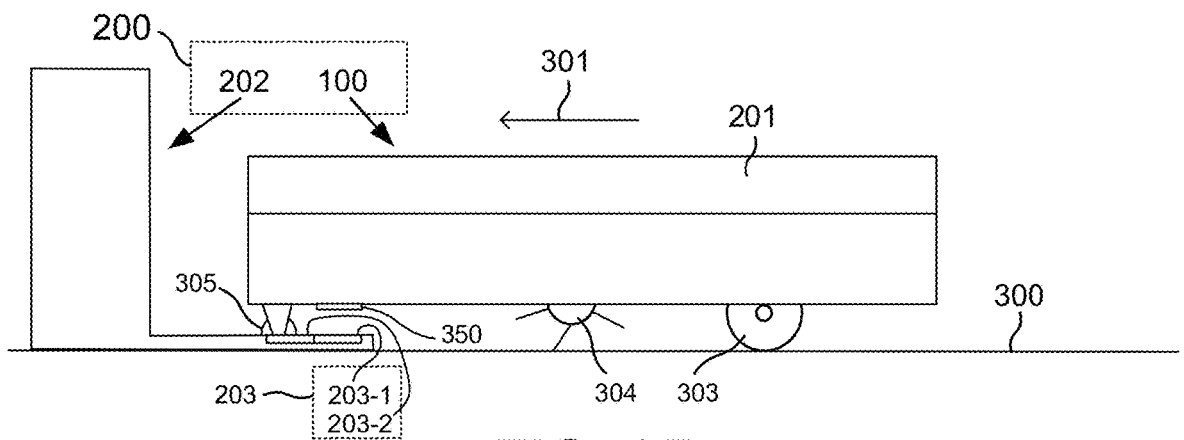
Figure 3C:
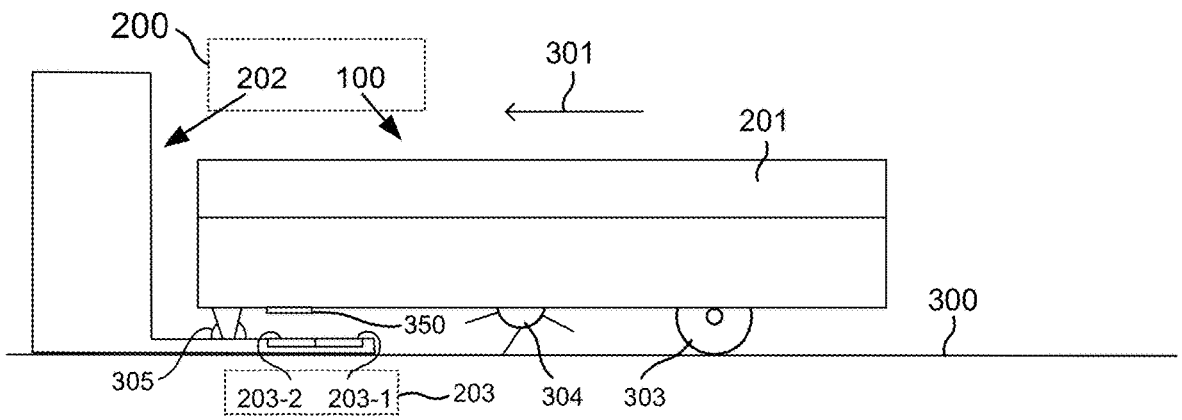

FIGS. 3A-3C show a side elevational view of the example of a system 200 of FIG. 2, which includes a device 100 which moves about or operates on a surface and a base station 202 for the device 100, in accordance with various embodiments. As illustrated in FIGS. 3A-3C, device 100 and base station 202 are disposed on a surface 300, upon which device 100 moves about and operates. Device 100 is depicted, by way of example and not of limitation, as a robotic cleaning appliance. Device 100 includes a surface type detection sensor assembly 350 coupled with housing 201 or any suitable portion of device 100. The surface type detection sensor assembly 350 includes a surface type detection sensor 150 (as will be described in conjunction with FIG. 4A). Although surface type detection sensor assembly 350 is shown on the bottom of device 100 and directed toward surface 300 (e.g., toward the floor), in other embodiments, a surface type detection sensor assembly 350 may additionally or alternatively be disposed on the top, side, or other portion for detecting vertical surfaces (e.g., walls) and/or overhanging surfaces. Device 100 may include one or more wheels 303 and/or 305, which may be driven and/or controlled by drive wheel controller(s) 170. Device 100 may include one or more surface treatment items, such as surface treatment item 304, which may be driven and/or controlled by surface treatment controller(s) 180. The depiction of surface treatment item 304 is merely an example and is not meant to limit the type of surface treatment item, tool, or tools represented by the depiction. Without limitation thereto, surface treatment item 304 may comprise one or more or some combination of: a suction tool or suction opening with respect to a floor surface of floor 300 or other surface; a rotary tool (e.g., a roller brush or broom); a sweeping tool (e.g., a broom); a wiping tool (e.g., a cloth/cloth covered surface); a brushing tool (e.g., a fixed or movable brush head); a dusting tool; a mopping tool; and a spraying tool configured to spray a cleaner or other liquid.

In FIG. 3A, device 100 is traveling in direction 301 on surface 300 and is preparing to dock with base station 202. In FIG. 3B, device 100 is still traveling in direction 301 on surface 300 and is beginning to dock with base station 202. In FIG. 3C, device 100 is still traveling in direction 301 and has nearly completed docking with base station 202.

With reference to FIG. 3A, sonic signals transmitted by a surface type detection sensor 150 may be emitted from an opening in surface type detection sensor assembly 350, toward surface 300, and corresponding returned signals received from the surface 300 may be utilized by device 100 to detect a surface type of surface 300. In embodiments where a surface type detection sensor assembly 350 is located on another portion of device 100 (e.g., a side or top portion) the surface may be a horizontal surface such as a wall, or an overhang such as the underside of a coffee table or chair.

With reference to FIG. 3B, sonic signals transmitted by a surface type detection sensor 150 may be emitted from an opening in surface type detection sensor assembly 350, toward sample surface 203-1, and corresponding returned signals received from the sample surface 203-1 may be utilized by device 100 to detect a surface type of sample surface 203-1. Because the location and surface type of sample surface 203-1 are known to device 100 this detection operation may be utilized to calibrate detection of these types of surfaces (e.g., soft surfaces), to store received returned signals as an exemplar to which other signals may be compared, to store a reflectivity metric associated with sample surface 203-1 as an exemplar for comparing to other reflectivity metrics, to detect for malfunctions or changes in the operation of a surface type detection sensor (such as changes over time, due to debris and/or dust particle accumulation, due to changes in temperature, aging, damage, humidity, mounting angle, etc.). In this manner sample surface(s) 203 (or other known surfaces) may utilized for calibration of surface type detection sensor assembly 350.

With reference to FIG. 3C, sonic signals transmitted by a surface type detection sensor 150 may be emitted from an opening in surface type detection sensor assembly 350, toward sample surface 203-2, and corresponding returned signals received from the sample surface 203-2 may be utilized by device 100 to detect a surface type of sample surface 203-2. Because the location and surface type of sample surface 203-2 are known to device 100 this detection operation may be utilized to calibrate detection of these types of surfaces (e.g., hard surfaces), to store received returned signals as an exemplar to which other signals may be compared, to store a reflectivity metric associated with sample surface 203-2 as an exemplar for comparing to other reflectivity metrics, to detect for malfunctions or changes in the operation of a surface type detection sensor (such as changes over time, due to debris accumulation, due to changes in temperature, etc.). Similarly, when a plurality of sample surfaces abut one another or are closely adjacent, the transition from one sample surface 203-1 to the next sample surface 203-1 may be utilized to test the ability to detect such surface type changes.

With respect to calibration. In some embodiments, the amount of a sonic signal transmitted by the surface type detection sensor 150 may vary from sensor to sensor, may vary due to environmental conditions (humidity, temperature, presence of debris in the sensor, etc.), and/or may also vary for an individual sensor during the lifetime of surface type detection sensor 150. Therefore, a calibration procedure may be used to improve the accuracy of the surface type determination. By knowing the amount of signal transmitted and/or the percentage of a transmitted signal received as a returned signal from a specific surface type, the reflected returned signal from any surface type can be more precisely characterized. Calibration may be done by measuring the reflection of returned signals from a known surface. For example, sensor 150 may be calibrated when device 100 is in a docking/charging base station 202 where the surface type below the device 100 is historically known due to repeated measurements during docking and undocking with the base station 202. The base station 202 may have one or more specially dedicated surface sample surface segments 203 (203-1, 203-2) which may be additionally or alternatively used for the calibration. Similarly, measuring the reflection of returned signals from a known surface may be used in machine learning, such as training a classifier to detect different surface types based on certain inputs.

Device 100 may engage, disengage, deploy, redeploy, adjust the height, adjust the speed, or make other adjustments of a surface treatment item 304 based all or in part upon a surface type detection performed using surface type detection sensor 150. For example, in response to such detection of the type of floor (e.g., hard floor or soft floor), or any other characteristics of the floor, device 100 may take one or more actions to adjust an aspect of the operation of the device 100. By way of example and not of limitation, in various embodiments device 100, or a portion thereof may: adjust a speed of movement of device 100; regulate a drive motor of device 100; moderate an amount of slip or spin permitted for a drive wheel of device 100; adjust or otherwise the speed of a suction motor of device 100 or otherwise moderate suction of a surface treatment item; adjust a height of a suction surface treatment item and/or suction opening with respect to a surface (e.g., surface 300); adjust a height of a rotary surface treatment item (e.g., a roller brush) or other surface treatment item of device 100 with respect to a surface; adjust a speed of rotation of a rotary surface treatment item of device 100; activate a rotary surface treatment item of device 100; deactivate a rotary surface treatment item of device 100; employ a liquid/spray cleaner tool of device 100; activate a brush tool of device 100; deactivate a brush tool of device 100; cease employment of a liquid/spray cleaner tool of device 100; employ a mop/wiping tool of device 100; cease deployment of a mop/wiping tool of device 100; employ a polishing tool of device 100; cease deployment of a polishing tool of device 100; activate an alarm or signal (audible, visible, or some combination) of or associated with device 100; and/or deactivate an alarm or signal of or associated with device 100. These and other actions may be performed by device 100 via instruction provided from a processor to: a surface treatment controller 180, to a drive wheel controller 170; and/or to other component(s) of device 100.

In some embodiments, surface detection and/or surface type detection may facilitate or assist in detecting whether a device is level, unlevel, stuck, or operating without one of its wheels/surface contact points in contact with a surface. For example, if device 100 moves partially past a drop off, such as over the edge of a stair or the edge of a roof, surface type detection sensor 150 may not be able to detect a surface or a surface type due to a surface being out of range or in the case of becoming stuck or unlevel may detect that a surface has dropped away substantially or gotten substantially closer since a previous measurement. Appropriate action may be initiated by device 100 to remedy a situation in which device 100 is detected to be unlevel, stuck, or operating without one of its wheels/surface contact points in contact with a surface.

Although FIGS. 3A-3C show only a single surface type detection sensor assembly 350, some embodiments may include a plurality of transducers, which may operate at different frequencies. The nature of a surface type may influence different frequencies in a different way, and therefore, using multiple frequencies may facilitate more accurate detection/determination of the surface type.

Example Surface Type Detection Sensor Assembly

Figure 4A:
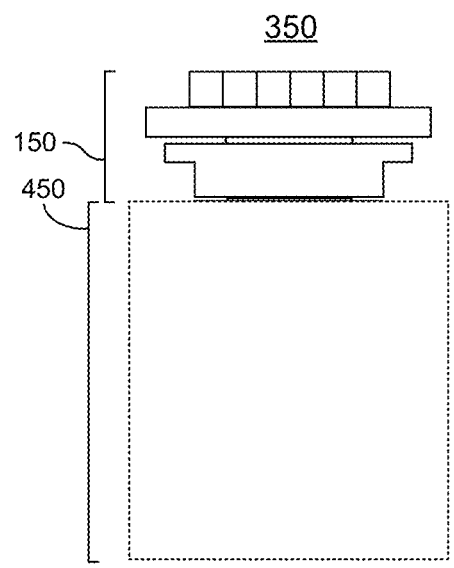
FIG. 4A illustrates a side elevational view of one example of a surface type detection sensor assembly which may be utilized on a device to transmit sonic signals and receive returned sonic signals, in accordance with various embodiments.

FIG. 4A illustrates a side elevational view of one example of a surface type detection sensor assembly 350 which may be utilized on a device 100 to transmit sonic signals and receive returned sonic signals, in accordance with various embodiments. Surface type detection sensor assembly 350 includes at least a surface type detection sensor 150. In some embodiments of surface type detection sensor assembly 350 a housing 450 (shown in dotted line), which encloses and/or defines an acoustic interface such as a tube, cavity, horn, or some combination thereof, may be included and coupled with surface type detection sensor 150. In other embodiments, surface type detection sensor assembly 350 includes surface type detection sensor 150 but not housing 450. In some embodiments, the surface type detection sensor assembly 350 is coupled with a device housing 201 (or other portion of device 100) such that it transmits the sonic signals in a direction toward which a surface is expected to be encountered or operated upon (e.g., downward toward a floor surface, laterally toward where a wall or object may intercept the path of travel of device 100, etc.). For example, in a floor vacuum or robotic floor cleaning embodiment of device 100, a surface type detection sensor assembly 350 may be disposed on or configured to sense outward from the bottom of device 100, for example in the manner illustrated in FIG. 3A, such that transmitted sonic signals are directed toward a floor surface 300 when device 100 is in operation. Similarly, in a flying drone embodiment (not depicted) of device 100 sonic signals may be transmitted in the direction of a surface upon which the drone may land. As described in FIGS. 1A and 1B surface type detection sensor 150 may also be coupled with a host processor 110 or a sensor processor, in some embodiments, either or both of which operate to process and make determinations based upon received returned signals.

Figure 4B:
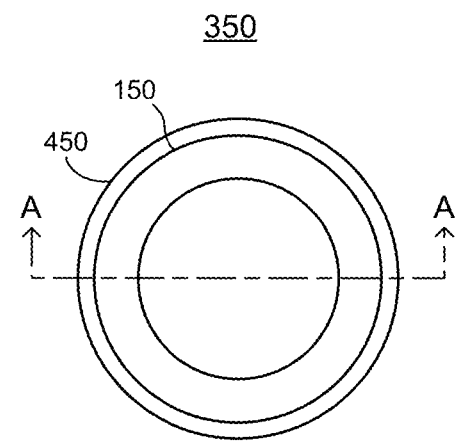
FIG. 4B illustrates a top view of the surface type detection sensor assembly of FIG. 4A, in accordance with various embodiments.

FIG. 4B illustrates a top view of the surface type detection sensor assembly 350 of FIG. 4A, in accordance with various embodiments. Section line A-A marks the location and orientation associated with sectional views illustrated in FIG. 4C.

Figure 4C:
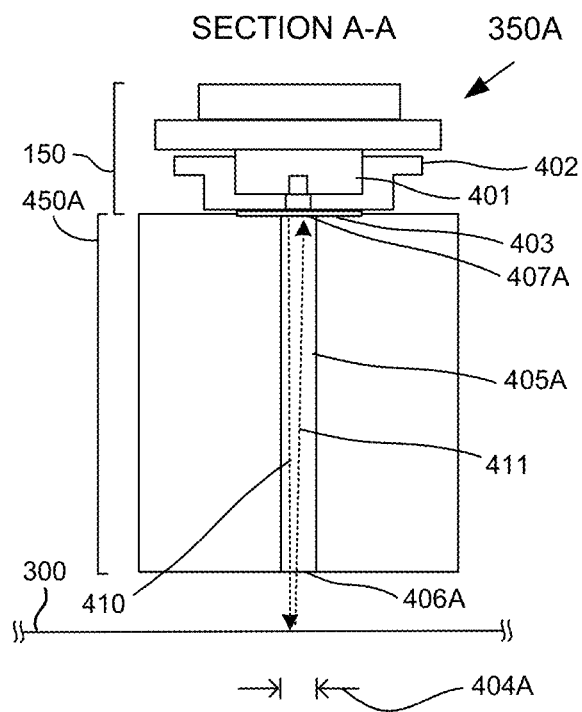
FIG. 4C illustrates a side sectional view of a configuration of a surface type detection sensor assembly, according to some embodiments.

FIG. 4C illustrates a side sectional view of a configuration of a surface type detection sensor assembly 350A, according to some embodiments. As can be seen, surface type detection sensor 150 includes a sonic transducer 401 (e.g., an ultrasonic transducer), which is covered by a cap 402 and separated from housing 450A by a membrane 403. Housing 450A encloses and/or defines an acoustic interface tube 405A (which may also referred to as a "horn" an "acoustic tube" or simply "tube"). Acoustic tube 405A facilitates the travel of sonic signals, with a direction of travel represented by directional arrow 410, transmitted from surface type detection sensor 150 into opening 407A of the acoustic interface tube 405A, through the length of acoustic interface tube 405A, and out of opening 406A toward surface 300. Acoustic tube 405A similarly facilitates the travel of sonic signals, with a direction of travel represented by directional arrow 411, returned from surface 300 into opening 406A of the acoustic interface tube 405A, through the length of acoustic interface tube 405A, and out of opening 407A to be received by surface type detection sensor 150. Acoustic interface tube 405A has a diameter 404A which is constant throughout the length of the tube 405A. It should be appreciated that the dimensions are presented only by way of example and that in other embodiments, for example, the diameter 404A may be larger or smaller, or vary along the length (e.g., getting wider near opening 406A). In some embodiments, dimensions of acoustic interface tube 405A may be selected to limit an acoustic field of view of the surface type detection sensor 150.

In one example embodiment, the received returned signals (such as those indicated by arrow 411) are digitized. The digitization may be performed by a DSP on-board surface type detection sensor 150, by a sensor processor 130, by a host processor 110, or by another processor.

Examples of a Plurality of Floor Surface Types

Figure 5:
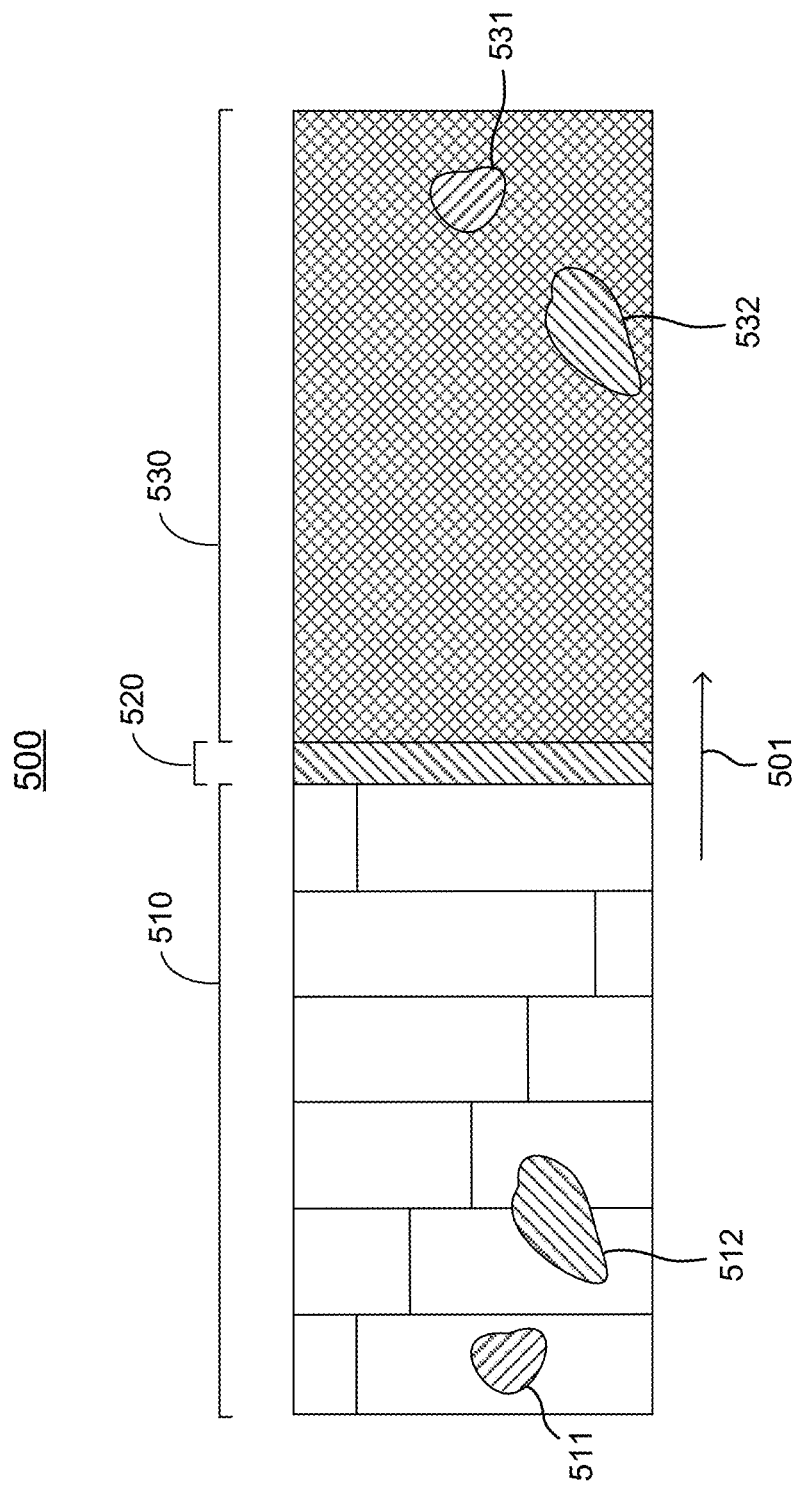
FIG. 5 shows top plan view of an expanse of a plurality of different floor surface types, in accordance with various embodiments.

FIG. 5 shows top plan view of an expanse 500 of floor materials with a plurality of different floor surface types. For example, expanse 500 includes a hardwood floor 510 separated, by a metal trim 520 transition, from a carpeted floor 530. Hardwood floor 510 is an example of a hard surface. Most of hardwood floor 510 is a clean floor, but area 511 represents a wet area (such as a puddle of water) and area 512 represents a dirty area (such as an area with tracked mud). In some embodiments, areas 511 and 512 may be distinguished from the clean and dry portions of hardwood floor 510 by analysis of returned signals received by surface type detection sensor 150. Carpeted floor 530 is an example of a soft surface. Most of carpeted floor 530 is a clean carpeted floor, but area 531 represents a wet area (such as a water-soaked region of carpet) and area 532 represents a dirty area (such as an area of carpet with tracked mud). In some embodiments, areas 531 and 532 may be distinguished from the clean and dry portions of carpeted floor 530 by analysis of returned signals received by surface type detection sensor 150. As previously discussed, there may be a variety of floor surface types and FIG. 5 illustrates only a small selection of them. Arrow 501 shows a direction of travel from left to right with respect to expanse 500. For example, a robotic cleaning appliance, such as device 100, may travel in direction 501 and encounter one or more of the different illustrated floor types during its movement.

Void Ringdown Signal Estimation and Comparison

Figure 6:
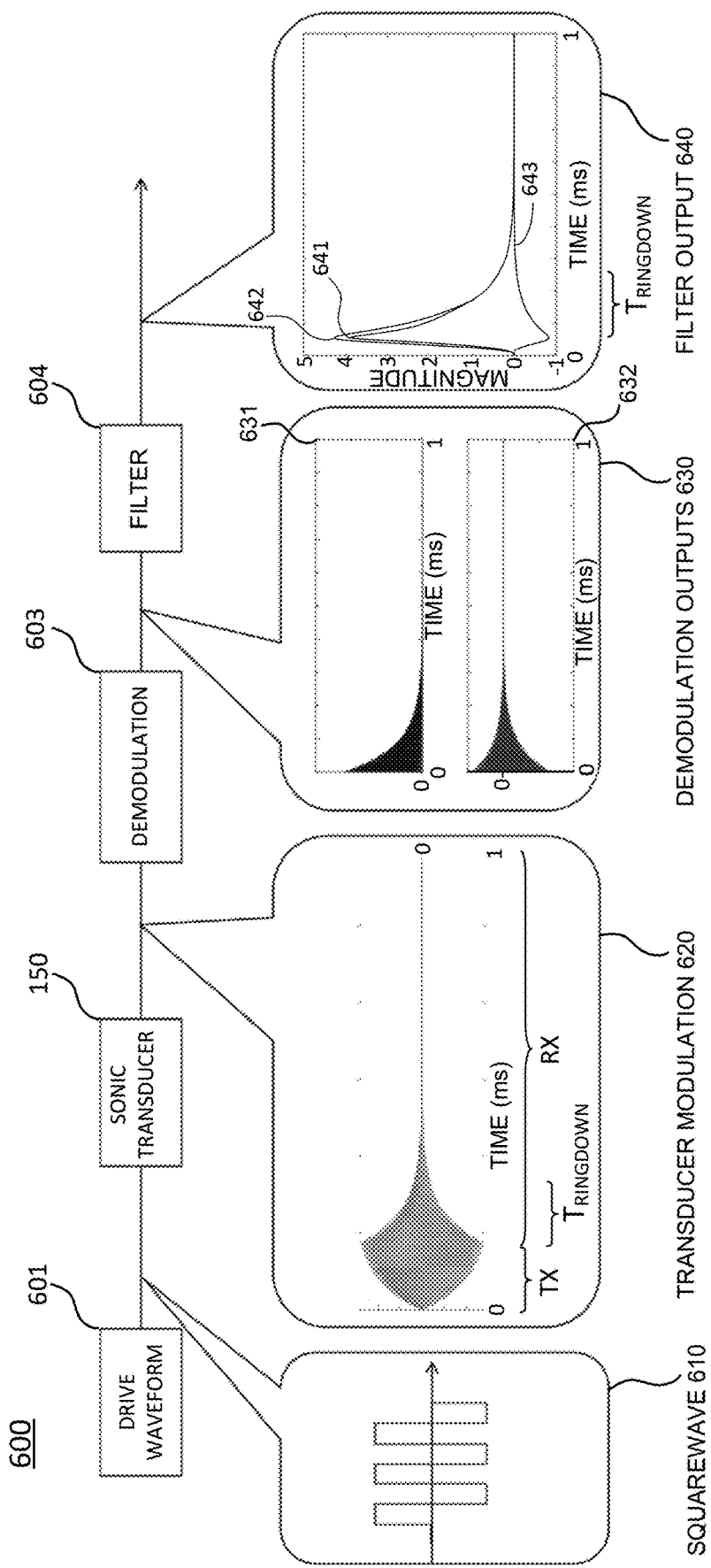
FIG. 6 illustrates a block diagram of the signal path of a surface type detection sensor, according to various embodiments.

FIG. 6 illustrates a block diagram of the signal path 600 of a sonic transducer embodiment of a surface type detection sensor 150, according to various embodiments. Starting from the upper left, a drive waveform 601 is applied to the sonic transducer 150. In some embodiments, the drive waveform may be a square wave such as square wave 610, however other oscillating waveforms may be used. The drive waveform 601 causes a membrane (e.g., membrane 403) of the sonic transducer 150 to be modulate/vibrate back and forth during a $T_X$ period (as shown by transducer modulation 620) and produce a sonic signal which is transmitted from the sonic transducer 150. When the drive waveform 601 ceases, active transmission ceases and receiving with the sonic transducer 150 begins. Part of the receiving of signals (during time $R_X$ of 620) takes place during the ringdown time ($T_{RINGDOWN}$) while the oscillating movement, which was induced by the drive waveform into the membrane 403 during the $T_X$ time period, attenuates to the point that received signals can be easily discerned as they induce their own modulation into the membrane 403. The received signals (in the $R_X$ period), can be analyzed for their magnitude and/or they can undergo demodulation 603 to gain access to demodulation outputs 630 such as in-phase (I) data 631 and quadrature (Q) data 632 in the complex domain. After filtering 604 with a finite impulse response (FIR) filter, cascaded integrated combo (CIC) filter, and/or other suitable filter, returned signals represented as a magnitude signal 641, filtered I signal 642, and/or filtered Q signal 643 are provided as outputs 640. The magnitude signal 641 is discussed, by way of example, in greater detail and with larger scaled diagrams in FIGS. 7A and 7B.

Figure 7A:
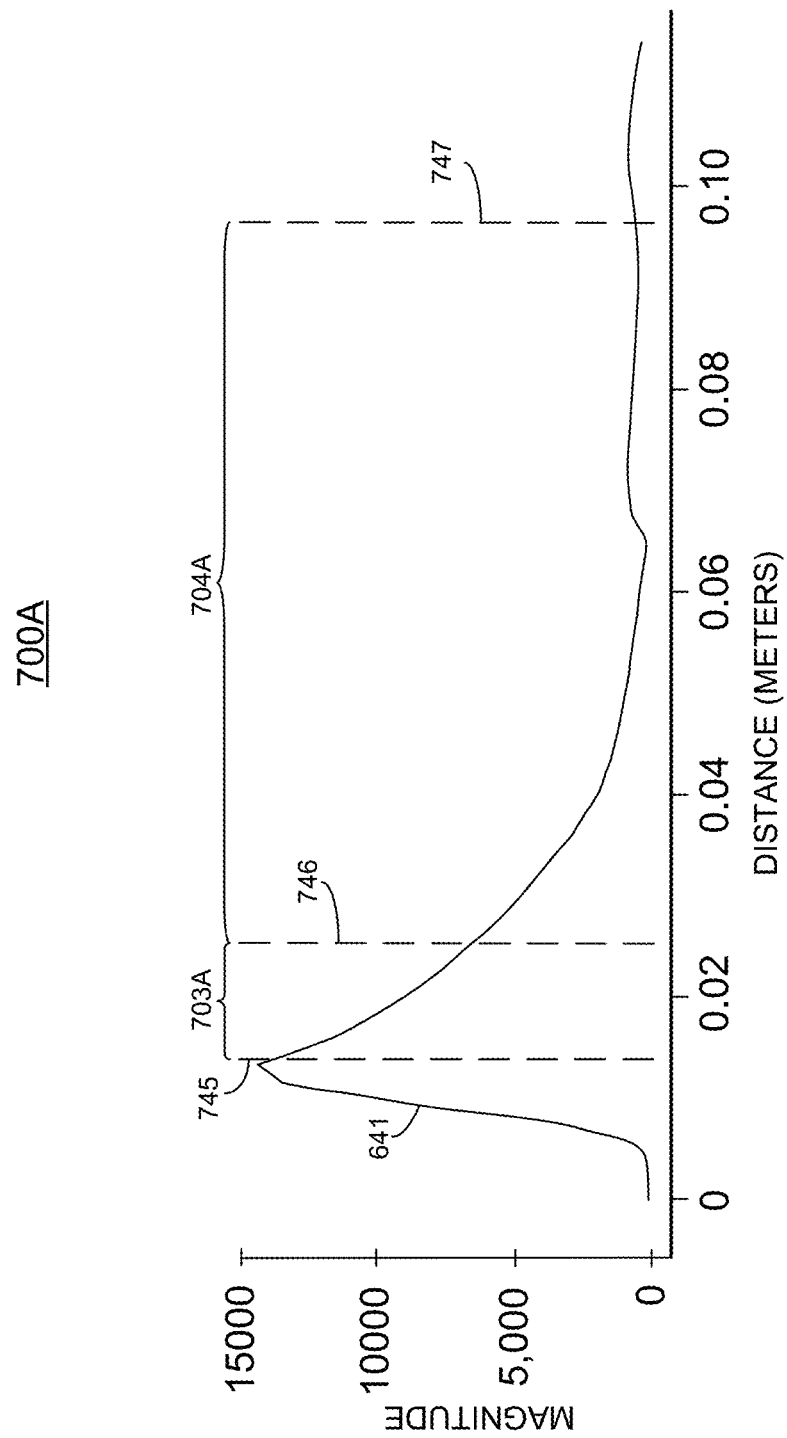
FIG. 7A shows a graph illustrating magnitudes of sampled returned signals from a surface type detection sensor, according to an embodiment.

FIG. 7A shows a graph 700A illustrating magnitudes of sampled returned signals from a surface type detection sensor 150, according to an embodiment. Samples fall along the line illustrated by magnitude signal 641, and the time of receipt of the samples is equated to the distance, in meters, to an object that would be associated with the receipt time of the sample (if it were a corresponding returned signal reflected from an object/surface). The peak of magnitude signal 641 is where active transmission of sonic signals ends, when a drive waveform 601 is no longer applied to sonic transducer 150. Ringdown decay immediately begins after this peak. Lines 745 and 746 demark a region of sampled points of data in an early portion 703A of the ringdown signal component of signal 641. For example, this region may encompass sampled points 9 through 15 (i.e., samples 9-15). A greater or lesser number of samples may be acquired in early portion 703A, so long as there are enough sampled points to model/fit a curve of the signal in this time period. With respect to samples between lines 745 and 746, due to distance and required round trip time of flight, it is physically unlikely or physically impossible for a returned signal to have been reflected from a floor or other surface and received back at sonic transducer 150. Thus, the signals sampled between lines 745 and 746 include only ringdown signals and no received returned signals that have been reflected from a floor or other surface. Samples taken during later portion 704A of the ringdown component of signal 641 will typically include some received returned signals if a floor, surface, or other object is close and reflects the signals. These returned signals will cause constructive or destructive interference in signal 641. Line 747 illustrates a time period of interest for the ringdown signals which occur been lines 746 and 747.

Although FIG. 7A illustrates only the magnitude signal 641, it should be appreciated that it could similarly illustrate the I data signal 642 and/or the Q data signal 643 and that either or both of the I data and Q data may be sampled between lines 745 and 746 (the early portion) or after line 746 (the later portion).

Figure 7B:
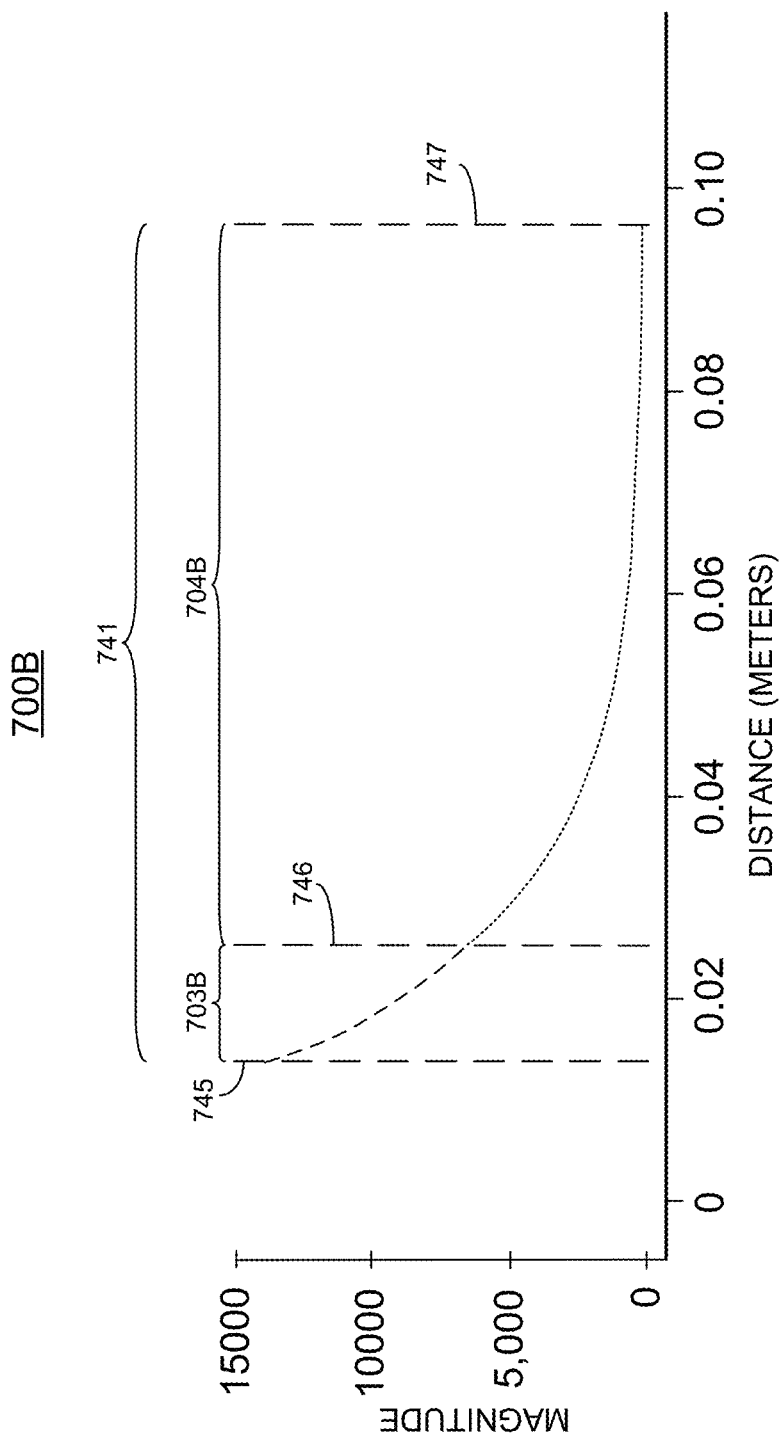
FIG. 7B shows a graph illustrating a curve fit to sampled returned signals from an early portion of a ringdown signal of a surface type detection sensor and used to estimate a void ringdown signal of a surface type detection sensor, according to an embodiment.

FIG. 7B shows a graph 700B illustrating a curve 741 fit to sampled points of returned signals from an early portion of a ringdown signal of a surface type detection sensor and used to estimate a void ringdown signal of a surface type detection sensor, according to an embodiment. In some embodiments, a processor (e.g., sensor processor 130, host processor, 110, or the like) determines a characteristic of the line of signal 641 which connects, for example, samples 9-15. The processor then applies a decay to model or estimate a void ringdown signal. In FIG. 7B, portion 703B of curve 741 is fit to sampled data of curve 641 during the early portion 703A, while portion 704B is a projected or estimated extension of the decaying slope of portion 741 that extends from line 746 to line 747. One example of a characteristic is the slope of the line another is the magnitude. One example of a decay is an exponential decay. The fit to the curve can be any suitable higher order fit/model, which is then extrapolated to the later portion of the signal. As illustrated in FIG. 7B, the estimated void ringdown signal models the later portion 704B of a ringdown signal 741, where this later portion 704B starts after points 9-17 (e.g., the early portion of ringdown 703A), in the absence of any returned signals arriving in a later portion of ringdown 704B, after line 746. Put differently, by applying a selected decay rate to the curve 703B formed by/modeled from measured points in the early portion, the later portion 704B is estimated based on the characteristics of the earlier portion. This void ringdown signal 741 is an estimate or model of what the ringdown component of later portion of (after line 746) of magnitude signal 641 would look like in the absence of any constructive or destructive interference caused by received returned signals. Additionally, it should be noted that the early portion 703B is also modeled from/fit to data which has been selected from a time period which should be free of most or all constructive or destructive interference caused by received returned signals In some embodiments, a processor (e.g., sensor processor 130, host processor, 110, or the like) compares estimated void ringdown signal 741 or a portion thereof with similar portions of the actual measured ringdown signal component of signal 641. In one example, example, portions 703A and 704A of FIG. 7A can be compared, respectively with portions 703B and 704B of FIG. 7B. In another example, portion 704A of FIG. 7A can be compared with portion 704B of FIG. 7B. The comparison can use the estimated void ringdown signal 741 to compensate for the actual measured ringdown signal component of signal 641. One such mechanism for comparison/compensation, is background subtraction, where the estimated void ringdown signal is subtracted from the actual ringdown signal, generating a difference. The resulting difference (i.e., the compensated signal) may be used to derive one or more metrics which represents magnitudes of the received returned in the compared portion of the actual returned signal 741. For example, any data point, or collection of data points, from the compensated ringdown signal can be used as a metric. For example, the metric can be based on one or more maxima of the compensated ringdown signal. In other examples, a sum, energy, integration, or surface area of the compensated signal may be used to determine the metric. In this manner, for example, a metric based on the compensated ringdown signal can be used to determine a type of surface, from a plurality of surface types, from which returned signals are reflected and received as part of the later portion of the ringdown signal. For example, this metric can be compared to a threshold to determine if the returned signals are from a certain type of surface (e.g., a hard floor if above a certain magnitude or a soft floor if not). If the type of surface is known a priori, the metric can be provided to a classifier as labeled data for machine learning.

The techniques depicted and described in conjunction with FIGS. 7A-7B with magnitude signal 641 can similarly be used with the filtered in-phase signal 642 or the filtered quadrature signal 643 to generate an estimated void ringdown portion of a signal and then compare it to the actually received ringdown portion of the same signal. In this manner, comparisons can be made and metrics generated from one or more of the magnitude signal, the filtered in-phase signal, and the filtered quadrature signal of sonic transducer 150. The metrics can be used to determine a type of surface, of a plurality of surface types, from which returned signals are reflected and received as part of the later portion of the ringdown signal.

Figure 7C:
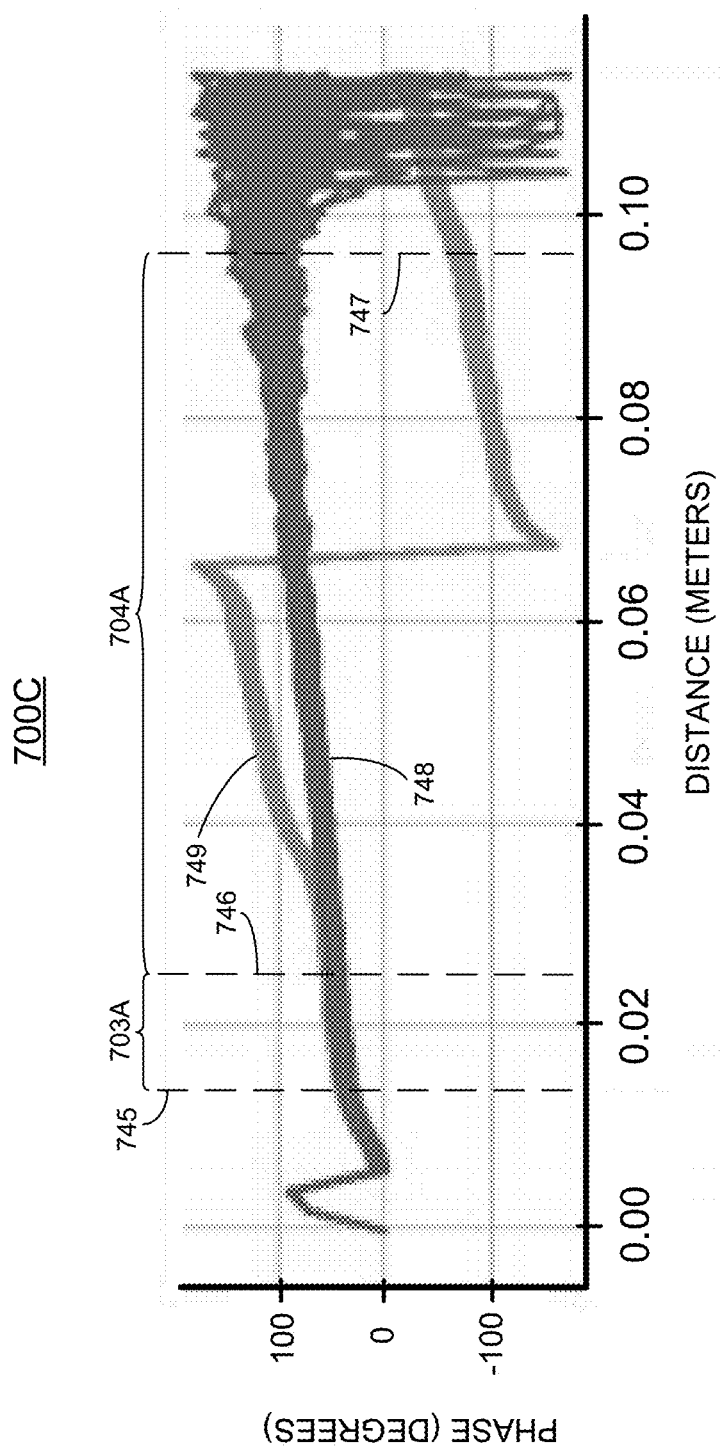
FIG. 7C shows a graph illustrating phases of two ringdown signals from a surface type detection sensor, according to an embodiment.

FIG. 7C shows a graph 700C illustrating phases of two ringdown signals from a surface type detection sensor 150, according to an embodiment. The y-axis of graph 700C represents the phase of the graphed ringdown signals 748 and 749. Graphed ringdown signal 748 represents an example phase graph of a void ringdown signal, beginning at line 745, where no (or very little) constructive or destructive interference from returned signals influences the phase. Graphed ringdown signal 749 represents an example phase graph of a ringdown signal, beginning at line 745, in which returned signals are received from a hard reflective surface and which influence the phase. As can be seen, graphed ringdown signal 749 shows a much larger change in the phase than graphed ringdown signal 748 due to the interference of the reflected signal and the ringdown signal. The jump in graphed ringdown signal 749 is due to the plotting of the phase in the range of −180 to 180 degrees.

Figure 8:
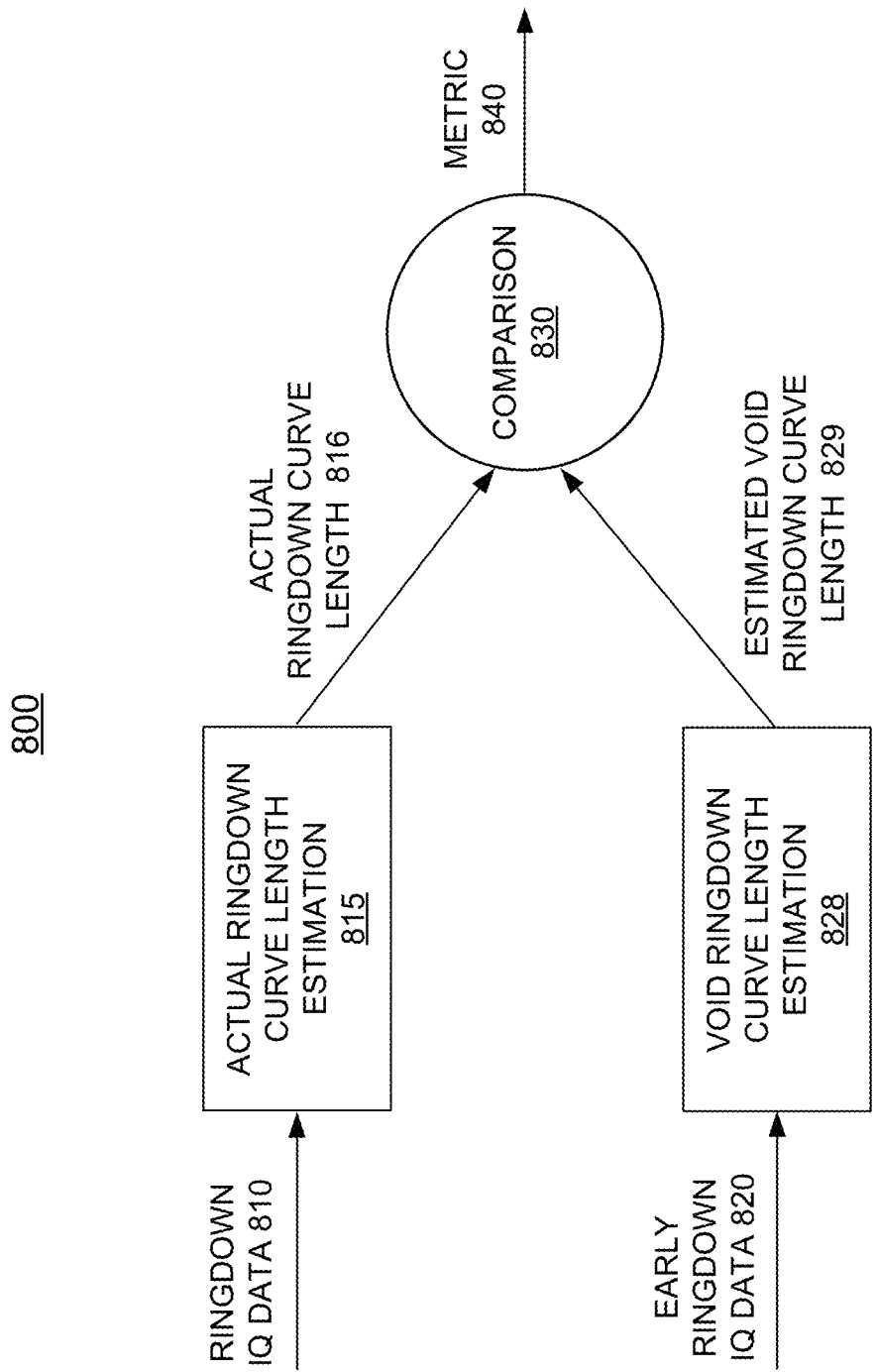
FIG. 8 shows a block diagram for determining a curve length, in the complex domain, for a ringdown signal and a void ringdown signal of a surface type detection sensor, according to an embodiment.

FIG. 8 shows a block diagram 800 for determining a curve length, in the complex domain, for a ringdown signal and a void ringdown signal of a surface type detection sensor, according to an embodiment. In some embodiments, a processor (e.g., sensor processor 130, host processor, 110, or the like) conducts the actions illustrated in FIG. 8.

Starting at the top left of FIG. 8, full ringdown I and Q data (IQ data 810) from a sonic transducer 150 is supplied as an input to ringdown curve length estimator 815. With reference to FIG. 6 and FIG. 7A, IQ data 810 (in other words, the complete data from the start of the ringdown) would encompass samples of points of the I and Q data in the window defined by lines 745 and 746 of FIG. 7A along (the early portion of ringdown) as well as data in the later point of ringdown which occurs after line 746. I and Q portions of IQ data 810 are processed and used to generate a curve in the complex domain, over time, of the I data plotted versus the Q data. The length of this curve is calculated, and the output is the actual ringdown curve length 816. Actual ringdown curve length 816 and its associated ringdown curves are provided to comparison block 830. This technique produces one curve per frame, where frame is an array of sampled IQ data, meaning one transmission and receiving cycle to produces the curves shown in the figures. The intra-frame sample time information is irrelevant to the curve-length metric, but the metric may change between frames. That is, the inter-frame sample rate determines the detection rate.

With continued reference to FIG. 8, starting in the lower left, early ringdown I and Q data 820 is provided as an input to void ringdown curve length estimator 828. The early ringdown IQ data is the IQ data obtained from samples of points in the early portion of ringdown (e.g., the I data 642 and Q data 643 of FIG. 6 that occurs between lines 745 and 746 of FIG. 7A) when no returned signals have yet been received by the sonic transducer 150. This early data may be processed in a similar fashion, as been described with respect to the estimation of a void ringdown signal 704B in FIG. 7B. For example, one or more characteristics of a line connecting a collection of points in the in-phase data of I and Q data 820 can then be decayed to estimate a void ringdown signal for the in-phase data. Similarly, one or more characteristics of a line connecting a collection of points in the quadrature data of I and Q data 820 can then be decayed to estimate a void ringdown signal for the in-phase data. Void ringdown curve length estimator 828 extends the I and Q void ringdown curves started by the early ringdown IQ data 820 and forms estimated void ringdown signals (a void in-phase ringdown signal and a void quadrature ringdown signal), in the complex domain, for a corresponding range as covered by IQ data 810. On a polar graph an ideal versions of these void ringdowns will form a straight line or a near straight line. Estimated void ringdown signal curve lengths 829 of the I and Q void ringdown signals are calculated and used to generate a curve in the complex domain, over time, of the I data plotted versus the Q data. The length of this curve is calculated and the output is the estimated void ringdown curve length 829. Estimated void ringdown curve length 829 and its associated ringdown curves are provided to comparison block 830.

On each sampled frame of IQ, curve lengths can be calculated. The void curve length is estimated from the early points of the IQ frame, as has been described. The signal curve length is computed from the entire data set of measured data in the frame. The final metric, per frame, is either of the absolute or relative difference of these curve lengths (either approach is valid). In this manner one metric per frame is calculated. In some embodiments, where between 10-100 frames/second occur, this results in an 10-100 curve length comparisons per second as well.

In block 830, the actual ringdown curve length 816 can be compared with the estimated void ringdown curve length 829, such as by subtraction or division to form metric 840. This metric can be used to determine a type of surface from which returned signals are reflected and received as part of the later portion of the ringdown signal. Likewise, the actual I and Q ringdown signals can be compared to the estimated void ringdown signals, such as by background subtraction to determine additional metrics at points along the time period associated with the ringdown signal. These additional metrics can be used to determine a type of surface from which returned signals are reflected and received as part of the later portion of the ringdown signal. The metric(s) can be compared to threshold(s) or reference metric(s) to determine the characteristics of the surface. For example, a higher curve length may correspond to a harder surface. Put differently, curve length difference between a measured ringdown signal and an estimated void ringdown signal is a representative of the strength of reflection of a surface, where a more reflective surface has a higher strength of reflection than a less reflective surface.

Figure 9:
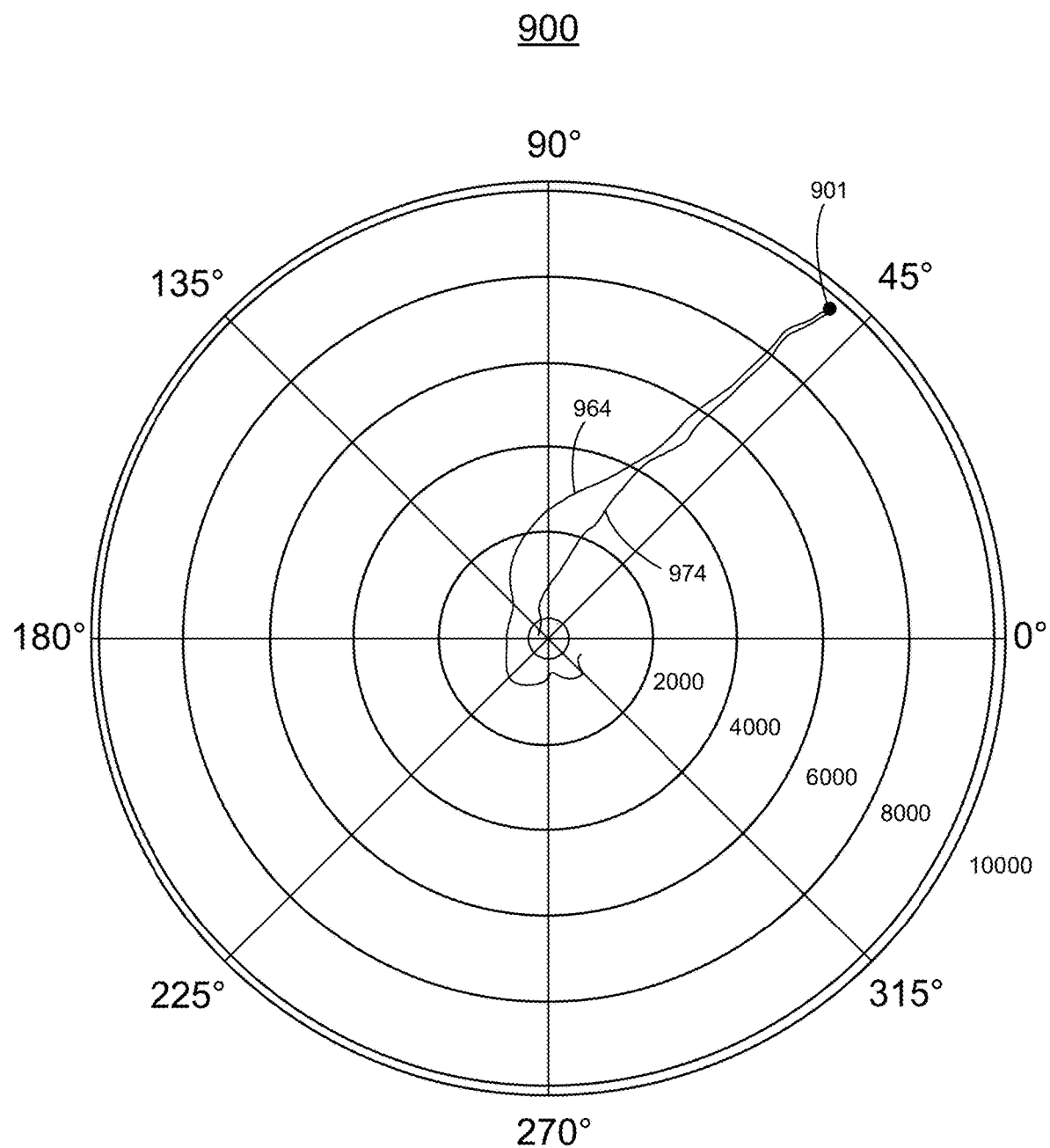
FIG. 9 illustrates the curve length, in the complex domain, of a void ringdown signal and a measured ringdown signal, of a surface type detection sensor, according to an embodiment.

FIG. 9 illustrates the curve length, in the complex domain, of a void ringdown signal 974 and a measured ringdown signal 964 of a surface type detection sensor 150, according to an embodiment. The angle represents the phase, while the intensity of the signal is represented from the origin out (2000-10000). Curves/Signals 974 and 964 both begin at the same maximum amplitude, at point 901, and decay in amplitude over time as the signals move toward the origin of the polar graph. For example, curve 964 may represent a visual depiction of the IQ data, while the summation 815 represents the length in an example where the phase and magnitude data for IQ ringdown signals are plotted against one another on a parametric plot such as polar plot 900 to produce a curve illustrated by curve 964. In this example, curve 964 is representative of an actually measured ringdown signal from a hard or reflective surface. The length of curve 964 can then be measured mathematically by a processor, such as processor 110 or sensor processor 130. Similarly, in this example embodiment, curve 974 is a visual depiction of the summation 820, where the phase and magnitude data for IQ ringdown signals are plotted against one another on a parametric plot such as polar plot 900 to produce a curve illustrated by curve 974. Curve 974 is representative of an estimated void ringdown signal. The length of curve 974 can then be measured mathematically by a processor, such as host processor 110 or sensor processor 130.

As can be seen, curve 964 has more variations in phase and is longer than curve 974 which is much closer to a straight line. The lengths of curves 964 and 974 can be compared mathematically, by a processor, to generate a metric by which floor type may be determined. Any metric that indicates how much curve 964 deviates from a straight line can be used as a metric to determine the floor type. For example, the difference between the curves may be compared to a threshold to determine how hard or soft a surface is, and consequently the type of the surface (e.g., carpet, epoxy, wood, terrazzo, concrete, tile, etc.). As can be discussed, this can be repeated many times per second.

Figure 10:
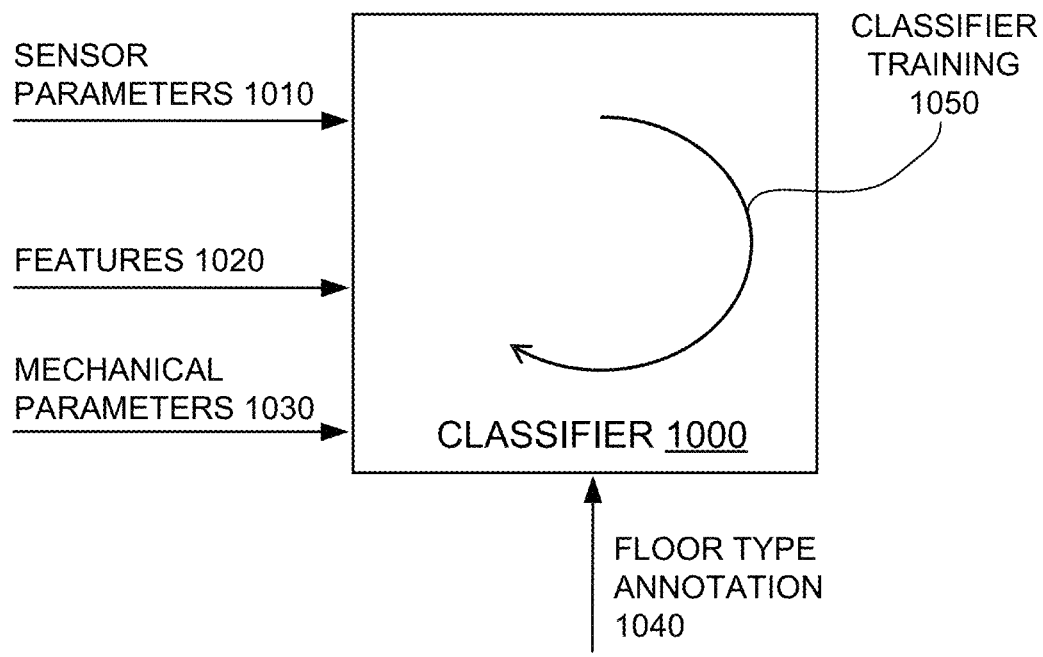
FIG. 10 illustrates a diagram of a classifier being trained to detect surface types based on inputs, in accordance with various embodiments.

FIG. 10 illustrates a diagram of a classifier 1000 being trained 1050 to detect surface types based on inputs, in accordance with various embodiments. The machine learning training utilizes labeled data (in this case floor type annotations 1040). The annotations of floor type 1040 can be binary such as hard (e.g., for wood, tile, concrete, or other hard surfaces) or soft (e.g., for carpet, rugs, or other soft surfaces). In other instances, the annotations of floor type 1040 may have greater nuance, such as wet (and in some instances how wet on a scale of wetness), dirty (and in some instances, how dirty and/or dirty with what), dry, hard (and in some instances, how hard on a scale of hardness), soft (and in some instances how soft on a scale of softness), etc. Other inputs that are provided in concert with the floor type annotations 1040 may include: sensor parameters 1010; features 1020; and mechanical parameters 1030. Features 1020 may include aspects such as curve length of a void ringdown curve, a comparison of actual and estimated void ringdown curve lengths, area between a void ringdown curve and a straight line; sensor parameters 1010 may include parameters such as the frequency and/or amplitude of the drive waveform 601 used to drive sonic transducer 150. Mechanical parameters may include aspects such as height of a sonic transducer 150 above a floor or surface being sensed; and angle of a sonic transducer 150 with respect to a floor or surface being sensed.

Figure 11:
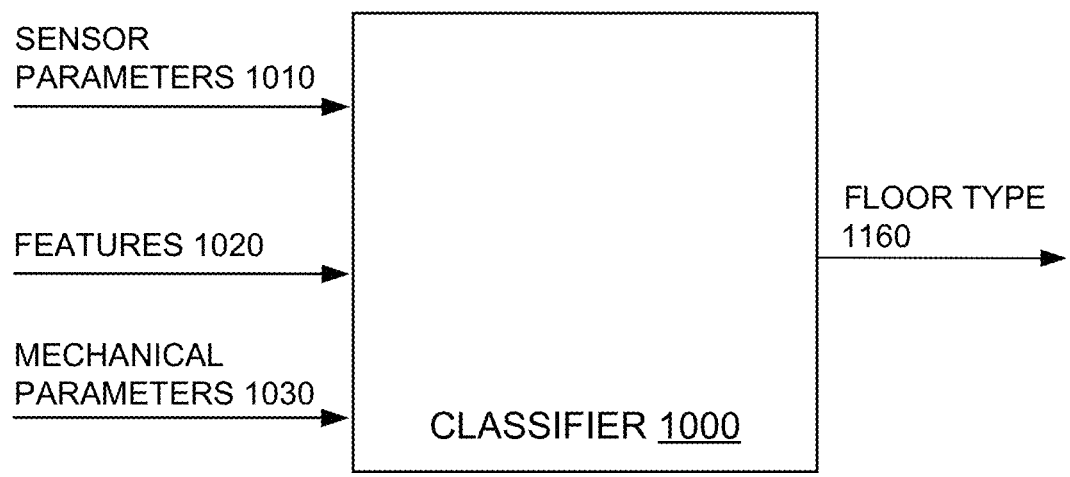
FIG. 11 illustrates a diagram of a trained classifier being used to detect surface types based on inputs, in accordance with various embodiments.

FIG. 11 illustrates a diagram of a trained classifier 1000 being used to detect surface types based on inputs, in accordance with various embodiments. For example, after training on inputs associated with known floor types (e.g., associated with floor type annotations 1040), inputs 1010, 1020, and/or 1030 can be supplied to classifier 1000 without floor type annotations 1040, and classifier 1000 can determine a floor type 1160, of a plurality of floor surface types (e.g., hard, soft, etc.), classified via the machine learning with those inputs.

Example Methods of Operation

Procedures of the methods illustrated by flow diagram 1200 of FIGS. 12A-12B will be described with reference to elements and/or components of one or more of FIGS. 1A-11. It is appreciated that in some embodiments, the procedures may be performed in a different order than described in a flow diagram, that some of the described procedures may not be performed, and/or that one or more additional procedures to those described may be performed. Flow diagram 1200 includes some procedures that, in various embodiments, are carried out by one or more processors (e.g., processor 130, host processor 110, a DSP, or the like) under the control of computer-readable and computer-executable instructions that are stored on non-transitory computer-readable storage media (e.g., host memory 111, internal memory 140, or the like). It is further appreciated that one or more procedures described in flow diagram 1200 may be implemented in hardware, or a combination of hardware with firmware and/or software.

For purposes of example only, the device 100 of FIGS. 1-3C is a robotic cleaning appliance which includes a surface type detection sensor 150 in the form of a sonic transducer which may operate in the ultrasonic frequency range. It may represent any type of robotic cleaning device such as a device that cleans by sweeping, wiping, mopping, polishing, or vacuuming a floor. However, it should be appreciated the robotic cleaning appliance may take other forms and have features and components other than those depicted and described.

In some embodiments, surface type detection sensor 150 is a floor type detection sensor which is generally used to detect the presence or absence of a floor 300 beneath robotic cleaning appliance 100 and further to collect returned signals from which the type of the floor (e.g., hard floor, soft floor, etc.) may be detected. In some embodiments, surface type detection sensor 150 is a wall type detection sensor which is generally used to detect the presence or absence of a wall laterally adjacent to robotic cleaning appliance 100 and further to collect returned signals from which the type of the floor (e.g., hard wall, soft wall, etc.) may be detected. In some embodiments, device 100 takes certain actions based on the type of floor surface detected by surface type detection sensor 150. For example, when device 100 is a robotic vehicle, propulsion may be adjusted based upon the type of surface upon which the robotic vehicle is operating.

Figure 12B:
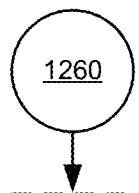

FIGS. 12A-12B illustrate a flow diagram 1200 of an example method of surface type detection, in accordance with various embodiments.

With reference to FIG. 12A, at procedure 1210 of flow diagram 1200, in various embodiments, a processor coupled with a sonic transducer, receives returned signals from the sonic transducer. The sonic transducer is configured to transmit sonic signals (with a direction of travel represented by arrow 410 of FIG. 4C) toward a surface, such as surface, and receive the returned signals (with a direction of travel represented by arrow 411 of FIG. 4C) reflected from the surface. The returned signals correspond to the transmitted sonic signals, and the surface is within a ringdown distance associated with the sonic transducer. Surface type detector 150 is one example of the sonic transducer. That is, the surface is so close that the some of the returned signals begin to be received while the sonic transducer is still ringing down. Host processor 110, sensor processor 130, and/or other suitable and available processor may the direct the transmission of the sonic signals and may receive and perform processing on the returned signals that are initially received at the sonic transducer.

With continued reference to FIG. 12A, at procedure 1220 of flow diagram 1200, in various embodiments, responsive to cessation of active transmission of the sonic signals, a plurality of points are sampled of a ringdown signal generated by the sonic transducer. The sampling occurs during an early portion of the ringdown signal before the returned signals from the surface have reflected back to be received by the sonic transducer. The sampling also occurs during a later portion of the ringdown signal which includes the returned signals. With reference to FIG. 6 and FIG. 7B, in one embodiment, the early portion sampling may occur during transducer ringdown before returned signals have begun being received at sonic transducer 150, such as at a time between lines 745 and 746. In the same embodiment, the later portion sampling may occur after line 746 and while ringdown is still taking place. Each of the samples of the returned signals has an amplitude which can be measured and then collectively digitally represented as a signal which can be processed to determine a magnitude signal, an in-phase signal (if demodulated), and/or a quadrature phase signal (if demodulated). Host processor 110, sensor processor 130, and/or other suitable and available processor may the perform the sampling.

With continued reference to FIG. 12A, at procedure 1230 of flow diagram 1200, in various embodiments, a void ringdown signal of the sonic transducer is estimated using the early portion of the plurality of sampled points. The estimated void ringdown signal represents performance of the sonic transducer in absence of any returned signals being received. It should be appreciated that the estimated void ringdown signal may be estimated once such as at a factory; more frequently such as at startup, when entering/exiting a dock/charging station, or on a recurring schedule; or in real-time/near real-time as required. Host processor 110, sensor processor 130, and/or other suitable and available processor may perform the estimating in the manner discussed with respect to FIG. 7A, FIG. 7B, and/or FIG. 8. The With continued reference to FIG. 12A, at procedure 1240 of flow diagram 1200, in various embodiments, the estimated void ringdown signal is compared to the later portion of the ringdown signal. The comparing may involve subtracting the two, such as by using a background subtraction technique (see e.g., FIG. 7B) based on one or more signal curves of actual ringdown compared to a corresponding estimated void ringdown signal; comparing lengths of signal curves for a ringdown signal and an estimated void ringdown curve lengths in the complex domain (see e.g., FIG. 8 and FIG. 9); or other comparison(s). Host processor 110, sensor processor 130, and/or other suitable and available processor may perform the comparison(s).

With continued reference to FIG. 12A, at procedure 1250 of flow diagram 1200, in various embodiments, a metric is generated based on a comparison. The metric may be the product of the comparison, the result of background subtraction, the difference between curve lengths, etc. In some embodiments, the metric is based on a comparison of a characteristic of the estimated void ringdown signal and the same characteristic in the later portion of the ringdown signal, where the characteristic is based on at least one of an in-phase component and a quadrature component. For example, the metric may be based on comparing the signal curves of curves in the complex domain and/or based on a comparison of respective curve lengths (in the complex domain) of the estimated void ringdown signal and the later portion of the ringdown signal. In some embodiments, the metric is based on a comparison of respective magnitudes of the estimated void ringdown signal and the later portion of the ringdown signal. Host processor 110, sensor processor 130, and/or other suitable and available processor may generate the metric With continued reference to FIG. 12A, at procedure 1260 of flow diagram 1200, in various embodiments, the metric is utilized to determine the type of the surface, out of a plurality of surface types. In some embodiments where background subtraction is used to generate the metric, the resulting difference achieved by the subtraction is the metric and it may be compared to a threshold to determine a surface type. For example, if the magnitude of the metric meets or exceeds the threshold it may be determined that one type of a surface (e.g., a hard floor) has been detected. While if the magnitude of the metric falls short of the threshold, it may be determined that another type of surface (e.g., a soft floor) has been detected. In other embodiments, such as where a curve length of difference in curve lengths is used as the metric, the metric may be provided as an input to a floor type classifier (e.g., classifier 1000) which has been trained to determine the type of the surface, out of a plurality of surface types. It should be appreciated that any metric, may be provided to a floor type classifier (e.g., classifier 1000) which has been trained using that type of metric. Host processor 110, sensor processor 130, and/or other suitable and available processor may make the determination, may act as a classifier, and/or may provide a metric to a separate classifier.

With reference to FIG. 12B, at procedure 1270 of flow diagram 1200, in various embodiments, the estimated void ringdown signal may be stored for future use with a subsequent transmission of sonic signals by the sonic transducer. That is, the estimated void ringdown signal may not be estimated each time it is used. Instead, it may be estimated once, then stored and used more than once. In one embodiment, the estimated void ringdown signal may be estimated once such as at a factory or manufacturing setting and then stored for future use. In another embodiment, the estimated void ringdown signal may be estimated at startup and then stored for future use until shutdown. In one embodiment, the estimated void ringdown signal may be estimated when exiting a dock/charging station and stored for future use until shutdown or the dock/charging station is re-entered. In some embodiments, the estimated void ringdown signal may be estimated at certain intervals, such as every minute during operation, every 5 minutes during operation, every month, or on some other interval or intervals, and then stored for future use. Host processor 110, sensor processor 130, and/or other suitable and available processor may store the estimated void ringdown signal in a memory (e.g., host memory 111, internal memory 140, or other storage).

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A robotic cleaning appliance comprising:
a housing to which is coupled a surface treatment item; and
a sonic transducer, coupled with the housing, and configured to transmit sonic signals toward a surface beneath the robotic cleaning appliance and receive corresponding returned signals reflected from the surface, wherein the surface is within a ringdown distance associated with the sonic transducer;
a processor coupled with the housing and configured to:
following cessation of active transmission of the sonic signals, sample a plurality of points of a ringdown signal generated by the sonic transducer, wherein the sampling occurs during an early portion of the ringdown signal before the corresponding returned signals from the surface have reflected back to be received by the sonic transducer, and the sampling also occurs during a later portion of the ringdown signal which includes the corresponding returned signals;
estimate, using the early portion of the plurality of sampled points, a void ringdown signal of the sonic transducer, wherein the estimated void ringdown signal represents performance of the sonic transducer in absence of any returned signals being received;
compare the estimated void ringdown signal to the later portion of the ringdown signal;
generate a metric based on a comparison; and
utilize the metric to determine a type of the surface, out of a plurality of surface types.

2. The robotic cleaning appliance of claim 1, wherein the processor is further configured to:
store the estimated void ringdown signal for future use with a subsequent transmission of sonic signals by the sonic transducer.

3. The robotic cleaning appliance of claim 1, wherein the processor configured to generate a metric based on a comparison comprises the processor configured to:
generate the metric based on a comparison of a characteristic of the estimated void ringdown signal and the same characteristic in the later portion of the ringdown signal, wherein the characteristic is based on at least one of an in-phase component and a quadrature component.

4. The robotic cleaning appliance of claim 3, wherein the processor configured to generate a metric based on a comparison comprises the processor configured to:
generate the metric based on a comparison of respective curve lengths of the estimated void ringdown signal and the later portion of the ringdown signal.

5. The robotic cleaning appliance of claim 1, wherein the processor configured to generate a metric based on a comparison comprises the processor configured to:
generate a metric based on a comparison of respective magnitudes of the estimated void ringdown signal and the later portion of the ringdown signal.

6. The robotic cleaning appliance of claim 1, wherein the processor configured to utilize the metric to determine the type of the surface, out of a plurality of surface types comprises the processor configured to:
provide the metric as an input to a floor type classifier trained to determine the type of the surface, out of a plurality of surface types.

7. The robotic cleaning appliance of claim 1, wherein the sonic signals are in the ultrasonic frequency range.

8. A sensor processing unit comprising:
a sonic transducer configured to transmit sonic signals toward a surface and receive corresponding returned signals reflected from the surface, wherein the surface is within a ringdown distance associated with the sonic transducer; and
a sensor processor coupled with the sonic transducer and configured to:
following cessation of active transmission of the sonic signals, sample a plurality of points of a ringdown signal generated by the sonic transducer, wherein the sampling occurs during an early portion of the ringdown signal before the corresponding returned signals from the surface have reflected back to be received by the sonic transducer and the sampling also occurs during a later portion of the ringdown signal which includes the corresponding returned signals;

estimate, using the early portion of the plurality of sampled points, a void ringdown signal of the sonic transducer, wherein the estimated void ringdown signal represents performance of the sonic transducer in absence of any returned signals being received;

compare the estimated void ringdown signal to the later portion of the ringdown signal;

generate a metric based on a comparison; and utilize the metric to determine a type of the surface, out of a plurality of surface types.

9. The sensor processing unit of claim 8, wherein the sensor processor is further configured to:

store the estimated void ringdown signal for future use with a subsequent transmission of sonic signals by the sonic transducer.

10. The sensor processing unit of claim 8, wherein the sensor processor configured to generate a metric based on a comparison comprises the processor configured to:

generate the metric based on a comparison of a characteristic of the estimated void ringdown signal and the same characteristic in the later portion of the ringdown signal, wherein the characteristic is based on at least one of an in-phase component and a quadrature component.

11. The sensor processing unit of claim 10, wherein the sensor processor configured to generate a metric based on a comparison comprises the processor configured to:

generate the metric based on a comparison of respective curve lengths of the estimated void ringdown signal and the later portion of the ringdown signal.

12. The sensor processing unit of claim 8, wherein the sensor processor configured to generate a metric based on a comparison comprises the processor configured to:

generate the metric based on a comparison of respective magnitudes of the estimated void ringdown signal and the later portion of the ringdown signal.

13. The sensor processing unit of claim 8, wherein the processor configured to utilize the metric to determine the type of the surface, out of a plurality of surface types comprises the processor configured to:

provide the metric as an input to a floor type classifier trained to determine the type of the surface, out of a plurality of surface types.

14. The sensor processing unit of claim 8, wherein the sonic signals are in the ultrasonic frequency range.

15. A method of surface type detection comprising:

receiving, by a processor coupled with a sonic transducer, returned signals from the sonic transducer, wherein the sonic transducer is configured to transmit sonic signals toward a surface and receive the returned signals reflected from the surface, wherein the returned signals correspond to the transmitted sonic signals, and wherein the surface is within a ringdown distance associated with the sonic transducer;

responsive to cessation of active transmission of the sonic signals, sampling, by the processor, a plurality of points of a ringdown signal generated by the sonic transducer, wherein the sampling occurs during an early portion of the ringdown signal before the returned signals from the surface have reflected back to be received by the sonic transducer and the sampling also occurs during a later portion of the ringdown signal which includes the returned signals;

estimating, by the processor, a void ringdown signal of the sonic transducer using the early portion of the plurality of sampled points, wherein the estimated void ringdown signal represents performance of the sonic transducer in absence of any returned signals being received;

comparing, by the processor, the estimated void ringdown signal to the later portion of the ringdown signal;

generating, by the processor, a metric based on a comparison; and utilizing, by the processor, the metric to determine the type of the surface, out of a plurality of surface types.

16. The method as recited in claim 15, further comprising:

storing, by the processor, the estimated void ringdown signal for future use with a subsequent transmission of sonic signals by the sonic transducer.

17. The method as recited in claim 15, wherein the generating, by the processor, a metric based on a comparison comprises:

generating, by the processor, the metric based on a comparison of a characteristic of the estimated void ringdown signal and the same characteristic in the later portion of the ringdown signal, wherein the characteristic is based on at least one of an in-phase component and a quadrature component.

18. The method as recited in claim 17, wherein the generating, by the processor, a metric based on a comparison comprises:

generating, by the processor, the metric based on a comparison of respective curve lengths of the estimated void ringdown signal and the later portion of the ringdown signal.

19. The method as recited in claim 15, wherein the generating, by the processor, a metric based on a comparison comprises:

generating, by the processor, the metric based on a comparison of respective magnitudes of the estimated void ringdown signal and the later portion of the ringdown signal.

20. The method as recited in claim 15, wherein the utilizing the metric to determine the type of the surface, out of a plurality of surface types comprises:

providing, by the processor, the metric as an input to a floor type classifier trained to determine the type of the surface, out of a plurality of surface types.

* * * * *

UNITED STATES PATENT AND TRADEMARK OFFICE
CERTIFICATE OF CORRECTION

PATENT NO. : 12,013,371 B2
APPLICATION NO. : 17/226447
DATED : June 18, 2024
INVENTOR(S) : Kline et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 571 days.

Signed and Sealed this
Twenty-ninth Day of April, 2025

Coke Morgan Stewart
*Acting Director of the United States Patent and Trademark Office*